US006816594B1

(12) United States Patent
Okeya

(10) Patent No.: US 6,816,594 B1
(45) Date of Patent: Nov. 9, 2004

(54) ELLIPTIC CURVE GENERATING METHOD AND DEVICE, ELLIPTIC ENCRYPTION SYSTEM AND RECORDING MEDIUM

(75) Inventor: Katsuyuki Okeya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/622,231

(22) PCT Filed: Sep. 8, 1999

(86) PCT No.: PCT/JP99/04869

§ 371 (c)(1),
(2), (4) Date: Feb. 21, 2001

(87) PCT Pub. No.: WO01/18772

PCT Pub. Date: Mar. 15, 2001

(51) Int. Cl.$^7$ .............................................. H04N 7/167
(52) U.S. Cl. ...................................................... 380/59
(58) Field of Search .......................................... 380/59

(56) References Cited

FOREIGN PATENT DOCUMENTS

| EP | 0 874 307 A1 | 10/1998 |
|---|---|---|
| EP | 0 892 520 A2 | 1/1999 |
| EP | 0 892 520 A3 | 10/2001 |
| EP | 1-215642 | 6/2002 |

OTHER PUBLICATIONS

Proceedings of the 1999 Symposium on Cryptography and Information Security, vol. I of II, "Elliptical Curve Exponentiation for Cryptosystem", Tetsuya, pp. 275–280.
Proceedings of the 1999 Symposium on Cryptography and Information Security, vol. II of II, "A Key Generation for Elliptic Curve Crystosystems Using Deterministic Primality Test", K. Akiyama, pp. 773–778.
Proceeding of the 1999 Symposium on Cryptography and Information Security, vol. II of II, "Choosing Secure Curves in Elliptic Curve Crystosystem", T. Izu et al, pp. 779–784.
Speeding the Pollard and Elliptic Curve Methods of Factorization, Peter J. Montgomery, Mathematics of Computeruzation, vol. 48, No. 177, Jan. 1987, pp. 243–264.
Technical Report of IEICE, "Notes on Finding Elliptic Curve with Prime Order and the Amount of Calculation", K. Horiuchi et al, pp. 31–36.
Technical Report of IEICE, "On Fast Implementation for Elliptic Curve Cryptosystem", K. Ohgishi et al, pp. 37–42.
Technical Report of IEICE, "Elliptic Curve Exponential without y–coordinate", I. Tetsuya, pp. 93–98.
G–J. Lay et al, " Constructing Elliptical Curves with Given Group Order over Large Finite Fields", Algorithmic Number Theory, International Symposium, 1994, pp. 250–263.
H. Cohen et al, " Efficient Elliptic Curve Exponentiation Using Mixed Coordinates", Asiacrypt. International Conference on the Theory and Application of Cryptology and Information Security, 1998, pp. 51–65.

(List continued on next page.)

Primary Examiner—Thomas R. Peeso
(74) Attorney, Agent, or Firm—Mattingly, Stanger & Malur, P.C.

(57) ABSTRACT

It is an object of the present invention to provide a method and an apparatus for generating a safe normal form elliptic curve transformable to a Montgomery type elliptic curve as well as to provide an elliptic curve cryptosystem and a storage medium therefor.

To achieve the above object, conditions concerning a curve order are extracted from criteria for transformability of a normal form elliptic curve to a Montgomery type elliptic curve and are given in a curve parameter generator incorporating a transformability judgement unit. Furthermore, to generate a curve having a cofactor of 4, the condition whether a curve order is divisible by 8 is given.

15 Claims, 29 Drawing Sheets

OTHER PUBLICATIONS

K. Okeya et al, "Elliptic Curves with the Montgomery–Form and Their Cryptographic Applications", Public Key Cryptography, Third International Workshop on Practice and Theory in Public Key Cryptography, 2000, pp. 238–257.

W. J. Caelli et al, "PKI, Elliptical Curve Cryptography, and Digital Signatures", Computers & Security, vol. 18, No. 1, 1999, pp. 47–66.

Certicom Research, "SEC 1: Elliptical Curve Cryptography", Standards for Efficient Cryptography, Working Draft Version 0.4, 1999, pp. 15–20.

Y. Sakai et al, "On the Power of Multidoubling in SPeeding Up Elliptical Scalar Multiplication", $16^{th}$ ACM Symposium on Applied Computing Mar. 11–14, 2001 Las Vegas, USA, Proceedings, 2001. pp. 268–283.

R. Schoof, "Elliptic Curves Over Finite Fields and the Computation of Square Roots mod p", Mathematics of Computation, V. 44, N. 4, Apr. 1985, pp. 483–494.

ANSI, X9.62, Public Key Cryptography for the Financial Serives Industry: The Elliptic Curve Digital Signature Algorithm (ECDSA), Jan. 1999.

FIG. 9

| −1 | A+2 | A−2 | B | CURVE ORDER |
|---|---|---|---|---|
| QUADRATIC RESIDUE | QUADRATIC RESIDUE | QUADRATIC NON-RESIDUE | QUADRATIC RESIDUE | DIVISIBLE BY 8 |
| QUADRATIC RESIDUE | QUADRATIC RESIDUE | QUADRATIC NON-RESIDUE | QUADRATIC NON-RESIDUE | INDIVISIBLE BY 8 |
| QUADRATIC RESIDUE | QUADRATIC NON-RESIDUE | QUADRATIC RESIDUE | QUADRATIC RESIDUE | DIVISIBLE BY 8 |
| QUADRATIC RESIDUE | QUADRATIC NON-RESIDUE | QUADRATIC RESIDUE | QUADRATIC NON-RESIDUE | INDIVISIBLE BY 8 |
| QUADRATIC RESIDUE | QUADRATIC RESIDUE | QUADRATIC RESIDUE | QUADRATIC RESIDUE | DIVISIBLE BY 8 |
| QUADRATIC RESIDUE | QUADRATIC RESIDUE | QUADRATIC RESIDUE | QUADRATIC NON-RESIDUE | INDIVISIBLE BY 8 |
| QUADRATIC RESIDUE | QUADRATIC NON-RESIDUE | QUADRATIC NON-RESIDUE | QUADRATIC RESIDUE | INDIVISIBLE BY 8 |
| QUADRATIC RESIDUE | QUADRATIC NON-RESIDUE | QUADRATIC NON-RESIDUE | QUADRATIC NON-RESIDUE | DIVISIBLE BY 8 |
| QUADRATIC NON-RESIDUE | QUADRATIC RESIDUE | QUADRATIC NON-RESIDUE | QUADRATIC RESIDUE | DIVISIBLE BY 8 |
| QUADRATIC NON-RESIDUE | QUADRATIC RESIDUE | QUADRATIC NON-RESIDUE | QUADRATIC NON-RESIDUE | DIVISIBLE BY 8 |
| QUADRATIC NON-RESIDUE | QUADRATIC NON-RESIDUE | QUADRATIC RESIDUE | QUADRATIC RESIDUE | INDIVISIBLE BY 8 |
| QUADRATIC NON-RESIDUE | QUADRATIC NON-RESIDUE | QUADRATIC RESIDUE | QUADRATIC NON-RESIDUE | INDIVISIBLE BY 8 |
| QUADRATIC NON-RESIDUE | QUADRATIC RESIDUE | QUADRATIC RESIDUE | QUADRATIC RESIDUE | DIVISIBLE BY 8 |
| QUADRATIC NON-RESIDUE | QUADRATIC RESIDUE | QUADRATIC RESIDUE | QUADRATIC NON-RESIDUE | DIVISIBLE BY 8 |
| QUADRATIC NON-RESIDUE | QUADRATIC NON-RESIDUE | QUADRATIC NON-RESIDUE | QUADRATIC RESIDUE | DIVISIBLE BY 8 |
| QUADRATIC NON-RESIDUE | QUADRATIC NON-RESIDUE | QUADRATIC NON-RESIDUE | QUADRATIC NON-RESIDUE | DIVISIBLE BY 8 |

ELLIPTIC CURVE GENERATING METHOD AND DEVICE, ELLIPTIC ENCRYPTION SYSTEM AND RECORDING MEDIUM

TECHNICAL FIELD

The present invention relates to a security technique for computer networks, and more particularly to a method for generating an elliptic curve used especially for elliptic curve cryptography, an elliptic curve apparatus, an elliptic curve cryptosystem, and a storage medium storing said method.

BACKGROUND ART

As an elliptic curve for elliptic curve cryptography, a normal form elliptic curve $y^2=f(x)$ may be used, where $f(x)=x^3+ax+b(a,b \in F_p)$ where $F_p$ is a finite field composed of p elements and p is a large prime number. Each set $(x_0,y_0)$, where $x_0,y_0 \in F_p$, satisfying the equation $y_0^2=f(x_0)$ is called a point on the curve. Operation can be performed in the set of all of these points plus a point at infinity, and the number of the points is called a curve order. When a curve order is denoted by n and expressed as n=cl where c is a positive integer, called a cofactor, and l is a large prime number, the elliptic curve is called safe if the value of c is small. In a method for generating a safe normal form elliptic curve, described in ANSI X9.62, "Public Key Cryptography for the Financial Services Industry: The Elliptic Curve Digital Signature Algorithm (ECDSA)", 1999, a normal form elliptic curve is repeatedly generated at random, and its safety is evaluated based on its curve order until a safe normal form elliptic curve is obtained.

Furthermore, according to "P. L. Montgomery, Speeding the Pollard and Elliptic Curve Methods of Factorization, Math. Comp. 48 (1987) 243–264", by using the Montgomery type elliptic curve $By^2=X^3+AX^2+X(A,B \in F_p)$, operation can be performed at higher speed than by use of a normal form elliptic curve. A normal form elliptic curve can be transformed to a Montgomery type elliptic curve when a point on the normal form elliptic curve corresponds to a point on the Montgomery type elliptic curve, one to one, and operation on one point coincides with operation on the other. Not all of normal form elliptic curves can be transformed to Montgomery type elliptic curves. Requirements for a normal form elliptic curve to be transformable to a Montgomery type elliptic curve are described in a paper entitled "Calculation Method for Elliptic Curve Cryptographic Operation" by Tetsuya Izu (1999 Symposium on Cryptography and Information Security, Publication vol. 1, 1999, 275–280). The above paper also discloses that the curve order of each Montgomery type elliptic curve is always divisible by 4.

However, the above conventional technique has given no consideration to generation of a normal form elliptic curve transformable to a Montgomery type elliptic curve. Therefore, to generate a safe normal form elliptic curve transformable to a Montgomery type elliptic curve, it is necessary to generate a safe normal form elliptic curve and then determine whether it is transformable to a Montgomery type elliptic curve, and if not, a safe normal form elliptic curve is generated again and the above procedure must be repeated until a safe normal form elliptic curve transformable to a Montgomery type elliptic curve is found. Generally, a process for generating a safe normal form elliptic curve takes longer time than a process for determining whether it can-be transformed to a Montgomery type elliptic curve. Because of this, generation of an elliptic curve having the above properties requires a large amount of time, making it difficult to regularly replace an elliptic curve with a new elliptic curve having the above properties in elliptic curve cryptography to ensure network security. Incidentally, to ensure security against an attack using the Baby-Step-Giant-Step method in which pre-calculation for the attack can be performed by knowing only the respective elliptic curve without knowing the public key, the elliptic curve must be regularly replaced with a new one, and no other effective methods exist. This means that in the above conventional technique, a specific elliptic curve is easily attacked.

It is an object of the present invention to provide a method, an apparatus, an elliptic curve cryptosystem, and a storage medium for generating an elliptic curve to improve operation speed and security.

DISCLOSURE OF INVENTION

To achieve the above object, the present invention provides a method for generating an elliptic curve, comprising the steps of: generating a first elliptic curve, for example, $y^2=x^3+ax+b$; determining whether said first elliptic curve can be transformed to a second elliptic curve, for example, $BY^2=X^3+AX^2+X$; and determining safety of the first elliptic curve transformable to said second elliptic curve. Here, as the first elliptic curve, an elliptic curve defined over a field of a predetermined prime order may be used. Further, said step of determining whether said first elliptic curve can be transformed to said second elliptic curve includes steps of: determining whether there is $\alpha$ for which $f(\alpha)=0$ for said first elliptic curve $y^2=f(x)=x^3+ax+b$; and determining whether $f'(\alpha)$ has a square root for $\alpha$ for which $f(\alpha)=0$. Further, said step of determining the safety of said first elliptic curve includes steps of: extracting information on a curve order of said first elliptic curve; and judging a cofactor based on the information on said curve order. The present invention further provides a method for generating an elliptic curve, comprising the steps of: generating a first elliptic curve $y^2=x^3+ax+b$; generating a second elliptic curve $y^2=x^3+ar^2x+br^3$; determining whether said first elliptic curve can be transformed to a third elliptic curve $BY^2=X^3+AX^2+X$; and when said first elliptic curve can be transformed to said third elliptic curve, judging safety of said first elliptic curve and said second elliptic curve. The present invention provides a method for generating an elliptic curve defined over a prime field in elliptic curve cryptography, comprising the steps of: randomly generating a normal form elliptic curve $y^2=x^3+ax+b$; determining whether said generated normal form elliptic curve $y^2=x^3+ax+b$ can be transformed to a Montgomery type elliptic curve $BY^2=X^3+AX^2+X$; determining divisibility of a curve order of said elliptic curve by 8; collecting information on the curve order of said elliptic curve; and judging a value of a cofactor based on the information on said curve order; wherein a normal form elliptic curve which can be transformed to a Montgomery type elliptic curve and whose cofactor is 4 is generated. The present invention provides an apparatus for generating an elliptic curve, comprising: elliptic curve candidate generating means for generating a first elliptic curve $y^2=x^3+ax+b$; transformability judgement means for determining whether said first elliptic curve can be transformed to a second elliptic curve $By^2=X^3+AX^2+X$; safety judgement means for determining safety of the first elliptic curve transformable to said second elliptic curve. Here, said transformability judgement means includes: root existence judgement means for determining whether there is $\alpha$ for which $f(\alpha)=0$ for said first elliptic curve; and square root judgement means for determining whether $f'(\alpha)$ has a square root for $\alpha$ for which $f(\alpha)=0$. Alternatively, said transformability judgement means includes: root existence judgement means for determining whether there is α for which f(α)=0 for said first elliptic curve; and quadratic residue judgement means for determining whether f'(α) is a quadratic residue for α for which f(α)=0. The present invention provides an apparatus for generating an elliptic curve employed in a cryptosystem in which a first computer and a second computer carry out cryptocommunications with each other, wherein said apparatus receives a request for generation of an elliptic curve from each said computer and generates a normal form elliptic curve transformable to a Montgomery type elliptic curve. The present invention provides a cryptosystem for carrying out cryptocommunications by use of elliptic curve cryptography, comprising: a first computer for receiving cryptocommunication; a second computer for transmitting cryptocommunication; and an elliptic curve generating apparatus for receiving a request for generation of an elliptic curve from said first computer and generating a normal form elliptic curve transformable to a Montgomery type elliptic curve. Further, said cryptosystem further comprises a curve replacement management apparatus for managing whether it is necessary to replace an elliptic curve being used for cryptocommunications, wherein when it becomes necessary to replace said elliptic curve, the elliptic curve is replaced with an elliptic curve newly generated by said elliptic curve generating apparatus to carry out cryptocommunications. It should be noted that to achieve the above object, a storage medium may be used to store programs implementing functions performed by the methods, apparatuses, and systems described above.

BRIEF DESCRIPTION OF DRAWINGS

FIG. 9 is a table listing conditions for divisibility by 8 according to the second embodiment of the present invention.

BEST MODE FOR CARRYING OUT THE INVENTION

Figure 14:
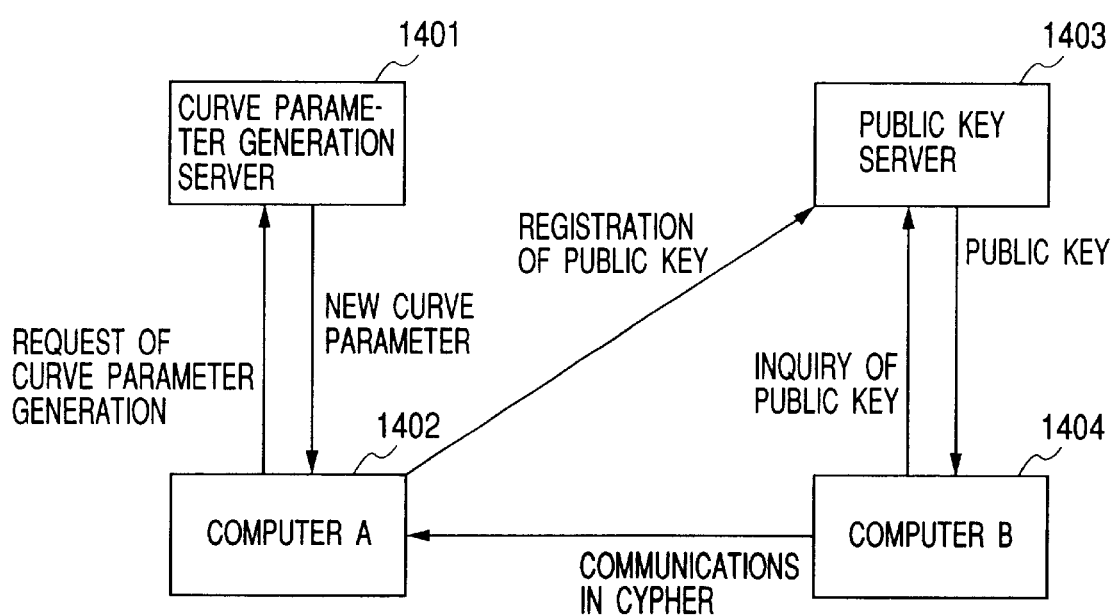
FIG. 14 is a configurational diagram of an elliptic curve cryptosystem according to the present invention.

An embodiment according to the present invention will be described below with reference to the accompanying drawings. FIG. 14 is a configurational diagram of an elliptic curve cryptosystem according to the present invention.

Figure 1:
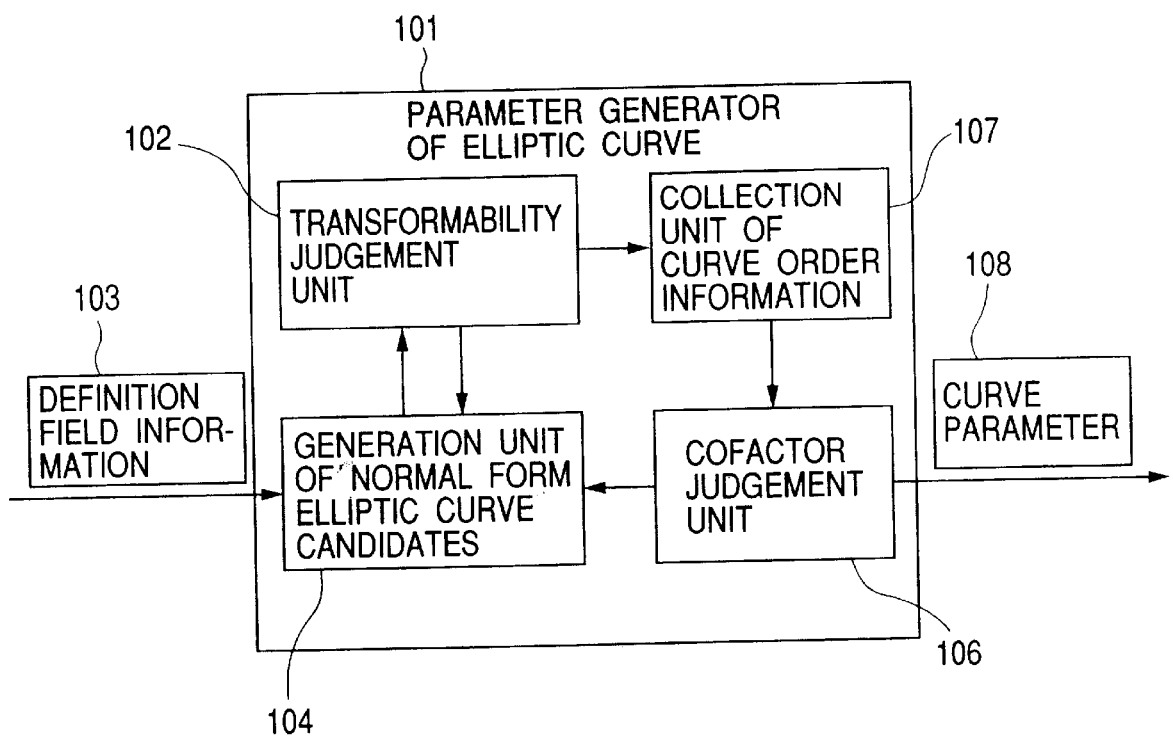
FIG. 1 is a diagram showing a flow of processes performed in a method and an apparatus for generating an elliptic curve in a curve parameter generation server in an elliptic curve cryptosystem according to a first embodiment of the present invention.
Figure 2:
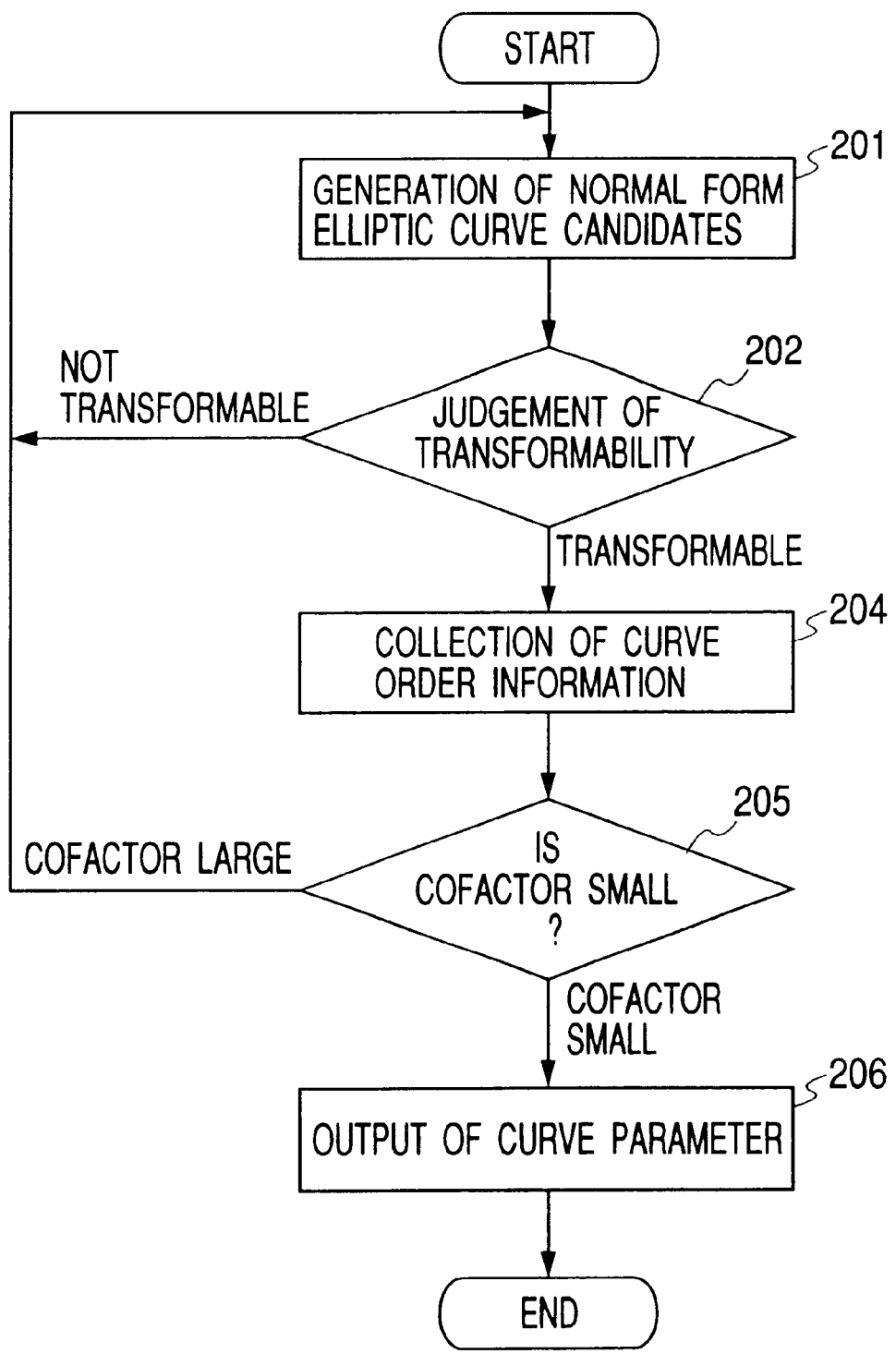
FIG. 2 is a flowchart showing a method for generating a safe normal form elliptic curve transformable to a Montgomery type elliptic curve, this method being included in a method and an apparatus for generating an elliptic curve according to the first embodiment of the present invention.

First, description will be made of a parameter generator of elliptic curve in a curve parameter generation server constituting an elliptic curve cryptosystem, with reference to FIGS. 1 and 2. FIG. 1 is a diagram showing a method for generating a safe normal form elliptic curve transformable to a Montgomery type elliptic curve in a curve parameter generation server in an elliptic curve cryptosystem according to a first embodiment. FIG. 2 is a flowchart showing a method for generating curve parameters for a normal form elliptic curve in a parameter generator of elliptic curve 101 according to the first embodiment.

Figure 27:
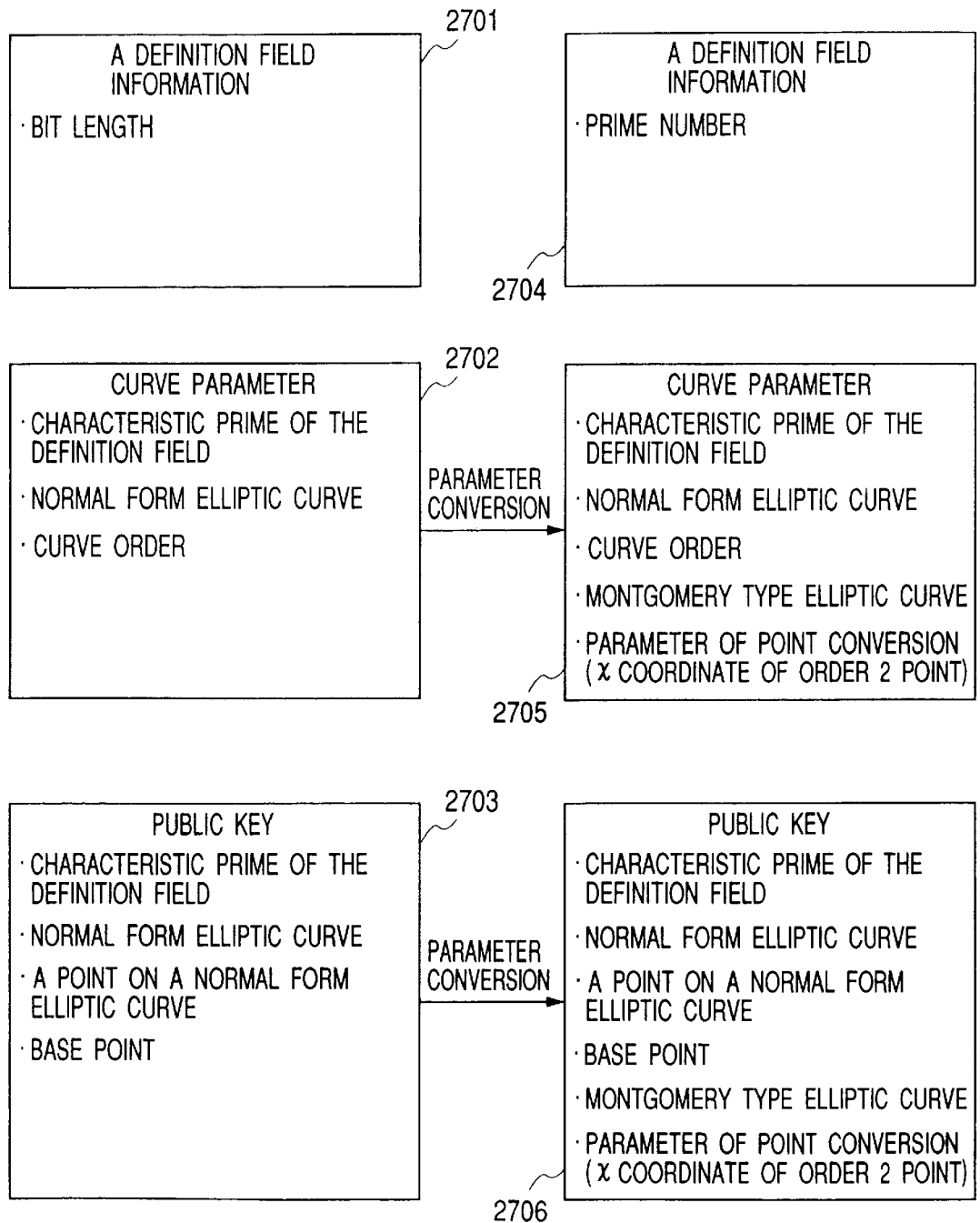
FIG. 27 shows a data structure according to embodiments of the present invention.

The parameter generator of elliptic curve 101 receives definition field information 103 and outputs curve parameters 108 using the following procedure. Here, as the definition field information 103, either definition field information 2701, which includes the bit length of the definition field, or definition field information 2704, which includes the characteristic prime of the definition field, is given as shown in FIG. 27. At step 201, a generation unit of normal form elliptic curve candidates 104 randomly generates a normal form elliptic curve based on the definition field information 103. A method for randomly generating a normal form elliptic curve is described in ANSI X9.62, "Public Key Cryptography for the Financial Services Industry: The Elliptic Curve Digital Signature Algorithm (ECDSA)", 1999. At step 202, a transformability judgement unit 102 determines whether a normal form elliptic curve generated in the generation unit of normal form elliptic curve candidates 104 can be transformed to a Montgomery type elliptic curve. If it cannot be transformed to a Montgomery type elliptic curve, the generation unit of normal form elliptic curve candidates 104 generates a normal form elliptic curve again and the same process is repeated until a normal form elliptic curve transformable to a Montgomery type elliptic curve is found. At step 204, a collection unit of curve order information 107 collects information on the curve order of a normal form elliptic curve which has been determined to be transformable to a Montgomery type elliptic curve by the transformability judgement unit 102. A curve order determination method in which information on the curve order of a given elliptic curve is collected to determine the curve order is described in "Elliptic curves over finite fields and the computation of square roots mod p", by R. Schoof, Math, Comp. 44, 1985, 483–494. A cofactor judgement unit 106 determines whether the cofactor is smaller than a value predetermined based on safety conditions using the information on the curve order obtained from the collection unit of curve order information 107, at step 205, and if the cofactor is larger than the value, the generation unit of normal form elliptic curve candidates 104 generates a normal form elliptic curve again. Then, by following the above procedure again, the cofactor judgement unit 106 determines whether the cofactor is smaller than the value using information on the curve order of a normal form elliptic curve transformable to a Montgomery type elliptic curve. The same procedure is repeated until it is determined that a cofactor is smaller than the value predetermined based on safety conditions. If a cofactor is smaller, the cofactor judgement unit 106 outputs a safe normal form elliptic curve which has been generated using the above procedure and which can be transformed to a Montgomery type elliptic curve, as curve parameters, at step 206.

The transformability judgement unit 102 judges whether a normal form elliptic curve can be transformed to a Montgomery type elliptic curve using the following procedure. A transformability judgement example will be described with reference to the flowchart in FIG. 3. To determine the existence of a solution, the transformability judgement unit 102 checks whether there is any element α of $F_p$ for which $f(\alpha)=0$ for the normal form elliptic curve $y^2=f(x)=x^3+ax+b$, at step 301. If there is no such element α, the transformability judgement unit 102 outputs the indication "not transformable" at step 304 and the process ends. If there is such an element α, the transformability judgement unit 102 judges whether there is an element α for which f'(α) is a quadratic residue in $F_p$ where f(α)=0 in quadratic residue determination at step 302. If there is such an element α, the transformability judgement unit 102 outputs the indication "transformable" at step 303 and the process ends. If there is no such element α, the transformability judgement unit 102 outputs the indication "not transformable" at step 304 and the process ends. Here, a residue modulo p (a prime) is called a quadratic residue when there is a square root, while it is called quadratic non-residue when there is no square root.

The basis of the possible formation of a judgment on transformability according to the procedure described above is explained as follows. In a Montgomery elliptic curve, there is a point (0,0), which becomes a point at infinity by a 2-time operation. In general, however, in a normal form elliptic curve, such a point does not always exist. In order for a normal form elliptic curve to be transformable to a Montgomery elliptic curve, the existence of a point that becomes a point at infinity by a 2-time operation on the normal form elliptic curve is required. Generally speaking, a point that does not become a point at infinity till an m-time operation is carried out is referred to as an m-order point. A point (α, 0) where α satisfies f(α)=0 is a 2-order point. If a normal form elliptic curve is transformable to a Montgomery elliptic curve, a 2-order point that exists on the normal form elliptic curve and becomes the point at infinity (0, 0) after transformation is required. Assume that a point (α, 0) is such a point. In this case, transformation of a point on a normal form elliptic curve to a point on a Montgomery elliptic curve must be expressed as $X=s(x-\alpha)$, $Y=ty(s\neq 0, t\neq 0)$ for $s,t\in F_p$. Since (X, Y) is a point on the Montgomery elliptic curve, X and Y satisfy the equation $BY^2=X^3+AX^2+X$. Substituting $s(x-\alpha)$ and ty for X and Y respectively in the equation $BY^2=X^3+AX^2+X$ results in an equation of $Bt^2y^2=s^3(x-\alpha)^3+As^2(x-\alpha)^2+s(x-\alpha)$. On the other hand, since (x, y) is a point on the normal form elliptic curve, x and y satisfy the function $y^2=f(x)$. Substituting f(x) for $y^2$ of the equation $Bt^2y^2=s^3(x-\alpha)^3+As^2(x-\alpha)^2+s(x-\alpha)$ results in an equation of $Bt^2f(x)=s^3(x-\alpha)^3+As^2(x-\alpha)^2+s(x-\alpha)$ By comparing the term $x^3$, $Bt^2=s^3$ is obtained. Substituting this in the above equation results in an equation of $s^2f(x)=s^2(x-\alpha)^3+As(x-\alpha)^2+(x-\alpha)$ as $s\neq 0$ hold true. Let the equation $s^2f(x)=s^2(x-\alpha)^3+As(x-\alpha)^2+(x-\alpha)$ be differentiated with respect to x, and substitute α for x in the resultant equation to get the equation $s^2f'(\alpha)=1$. Since s is an element of $F_p$, f'(α) must be a quadratic residue. In addition, at that time, A=3αs and $B=s^3/t^2$ hold true. Conversely speaking, if f'(α) is a quadratic residue, by setting $s=t=f'(\alpha)^{-1/2}$, A=3αs, and B=s, the normal form elliptic curve can be transformed to a Montgomery elliptic curve represented by the equation $BY^2=X^3+AX^2+X$.

The above description indicates that the judgment on transformability can be formed in accordance with the procedure described above since the procedure is based on the following requirement. That is to say, the fact that a 2-order point on an normal form elliptic curve can become a 2-order point on an Montgomery elliptic curve and vice versa is required as a necessary condition for transformability.

In addition, the fact that the curve order of a Montgomery elliptic curve can be divided by 4 can be understood as follows. The point (0,0) on a Montgomery elliptic curve is a 2-order point. If a discriminant ($A^2-4$) of the expression $x^2+AX+1$ is a quadratic residue, the equation $X^2+AX+1=0$ has roots in $F_p$. Thus, since there are two 2-order points other than the point (0, 0), the curve order of a Montgomery elliptic curve can be divided by 4. If the discriminant ($A^2-4$) is a quadratic non-residue, on the other hand, only one of expressions (A+2) and (A−2) is a quadratic residue while the other is a quadratic non-residue. Thus, one of the expressions (A+2)/B and (A−2)/B is a quadratic residue. If the expression (A+2)/B is a quadratic residue, coordinates (1, ±γ) each represent a 4-order point where the symbol γ denotes a square root for the quadratic residue. If the expression (A−2)/B is a quadratic residue, on the other hand, coordinates (−1,±γ') each represent a 4-order point where the symbol γ' denotes a square root for the quadratic residue. Thus, the curve order can be divided by 4 in either case.

Operation speed on an elliptic curve depends on a definition field size. The operation speed decreases as the definition field size increases. The safety of an elliptic curve depends on the size of the maximum prime number included in its curve order. The larger the prime number, the safer the elliptic curve. With the size of a definition field fixed, the cofactor must be reduced to enhance safety. Since the curve order of a Montgomery type elliptic curve can be divided by 4, its cofactor is 4 or more. To enhance safety to a maximum with the size of a definition field fixed, the cofactor must be set to be 4.

It should be noted that other transformability criteria can be used instead of use of the curve order. One of such methods is described on page 278 of the document "Calculation Method for Elliptic Curve Cryptographic Operation" (1999 Symposium on Cryptography and Information Security, Publication vol. 1, 1999, 275–280).

Figure 4:
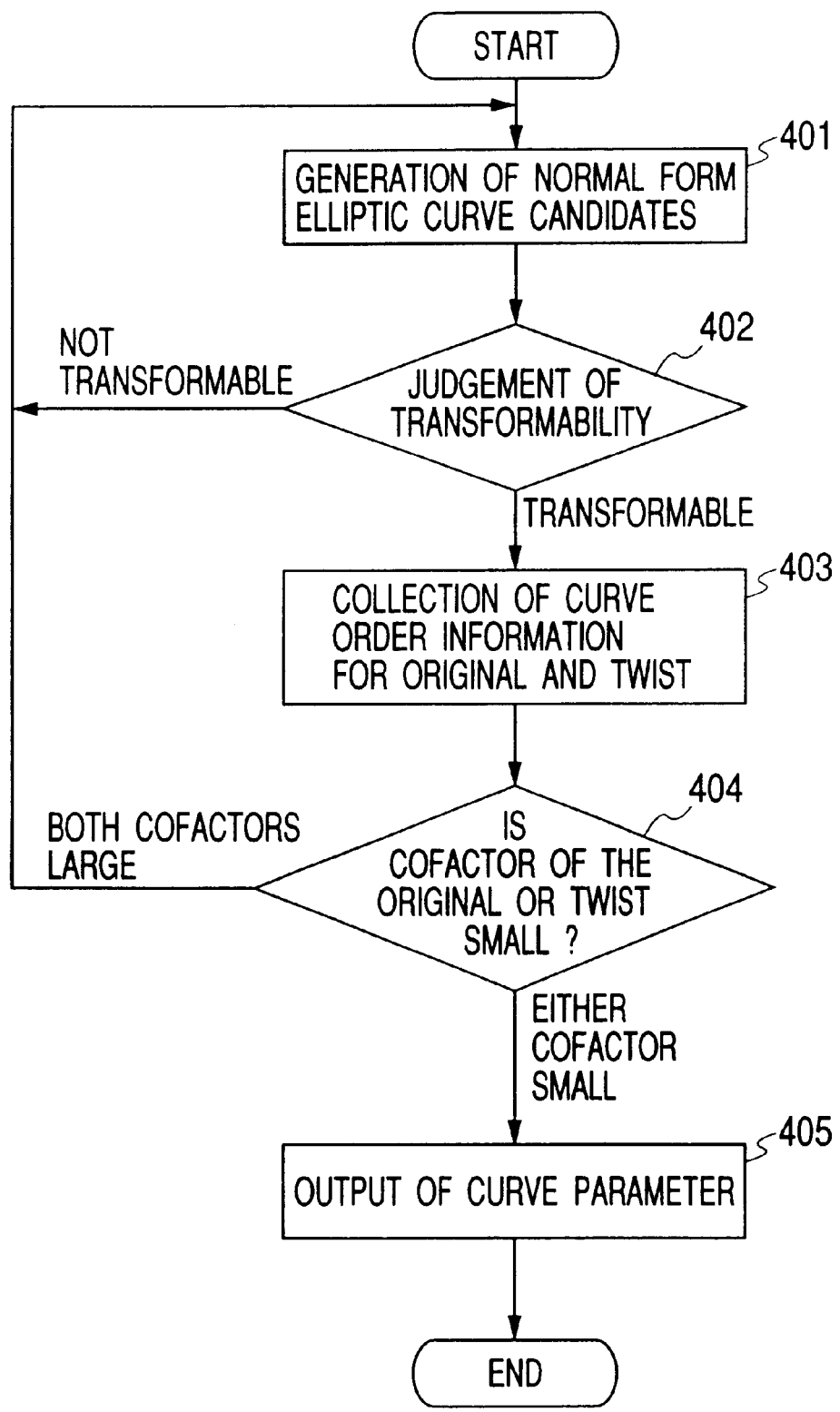
FIG. 4 is a flowchart showing a method for generating a safe normal form elliptic curve transformable to a Montgomery type elliptic curve, this method being included in a method and an apparatus for generating an elliptic curve according to applications of the first and the second embodiments of the present invention.

Next, description will be made of an application of the method of the first embodiment for generating a safe normal form elliptic curve transformable to a Montgomery type elliptic curve in a curve parameter generation server 1401 in an elliptic curve cryptosystem shown in FIG. 14 with reference to FIGS. 1 and 4. FIG. 4 is a flowchart showing a method for generating curve parameters of a normal form elliptic curve in the parameter generator of elliptic curve 101.

The parameter generator of elliptic curve 101 receives definition field information 103 and outputs curve parameters 108 using the following procedure. Here, as the definition field information 103, either definition field information 2701, which includes the bit length of the definition field, or definition field information 2704, which includes the characteristic prime of the definition field, is given as shown in FIG. 27. At step 401, the generation unit of normal form elliptic curve candidates 104 randomly generates a normal form elliptic curve based on the definition field information 103. The normal form elliptic curve $y^2=f_r(x)=x^3+ar^2x+br^3$ is called the twist of the normal form elliptic curve $y^2=f(x)=x^3+ax+b$, where an element r is a quadratic non-residue in $F^p$. To discriminate from the twist, the normal form elliptic curve $y^2=x^3+ax+b$ is explicitly called "original". At step 402, the transformability judgement unit 102 determines whether a normal form elliptic curve and its twist normal form elliptic curve both generated in the generation unit of normal form elliptic curve candidates 104 can be transformed to Montgomery type elliptic curves. If the original normal form elliptic curve can be transformed to a Montgomery type elliptic curve, so can its twist normal form elliptic curve. When both curves are not transformable, the generation unit of normal form elliptic curve candidates 104 generates a normal form elliptic curve again and the above process is repeated until a normal form elliptic curve transformable to a Montgomery type elliptic curve is found. At step 403, the collection unit of curve order information 107 collects information on the curve orders of original and twist normal form elliptic curves which have been determined to be transformable to Montgomery type elliptic curves by the transformability judgement unit 102. The cofactor judgement unit 106 determines whether each cofactor is smaller than a value predetermined based on safety conditions using information on the curve orders of the original and the twist obtained by the collection unit of curve order information 107, at step 404, and if both cofactors are larger than the value, the generation unit of normal form elliptic curve candidates 104 generates a normal form elliptic curve again. Then, by following the above procedure again, the cofactor judgement unit 106 determines whether each cofactor is smaller than the value using information on the curve orders of the normal form elliptic curves transformable to Montgomery type elliptic curves. The same procedure is repeated until it is determined that one of the cofactors is smaller than the value predetermined based on safety conditions. If one of the cofactors is smaller, the cofactor judgement unit 106 outputs the safe normal form elliptic curve which has been generated using the above procedure and which can be transformed to a Montgomery type elliptic curve, as curve parameters, at step 405. In the above application, since transformability of both an original and its twist normal form elliptic curves to Montgomery type elliptic curves are determined together at once, it is possible to increase the number of normal form -elliptic curve candidates subjected to stability judgement, resulting in curve generation at higher speed.

When an original normal form elliptic curve can be transformed to a Montgomery type elliptic curve, its twist normal form elliptic curve also can be transformed to a Montgomery type elliptic curve based on the following reason. Since an original normal form elliptic curve can be transformed to a Montgomery type elliptic curve, $f(\alpha)=0$ and there is a for which $f'(\alpha)$ is a quadratic residue. At that time, since $f_r(r\ \alpha)=0$ and $f_r'(r\ \alpha)=r^2 f'(\alpha)$, $f_r'(r\ \alpha)$ is a quadratic residue. Therefore, the twist normal form elliptic curve also can be transformed to a Montgomery type elliptic curve. Similarly, since an original normal form elliptic curve is the twist of its twist normal form elliptic curve, if a twist normal form elliptic curve can be transformed to a Montgomery type elliptic curve, its original normal form elliptic curve also can be transformed to a Montgomery type elliptic curve. When the original normal form elliptic curve $y^2=x^2+ax+b$ is transformed to the Montgomery type elliptic curve $BY^2=X^3+AX^2+X$, the twist normal form elliptic curve $y^2=x^3+ar^2x+br^3$ is transformed to the Montgomery type elliptic curve $(B/r)Y^2=X^3+AX^2+X$.

Figure 5:
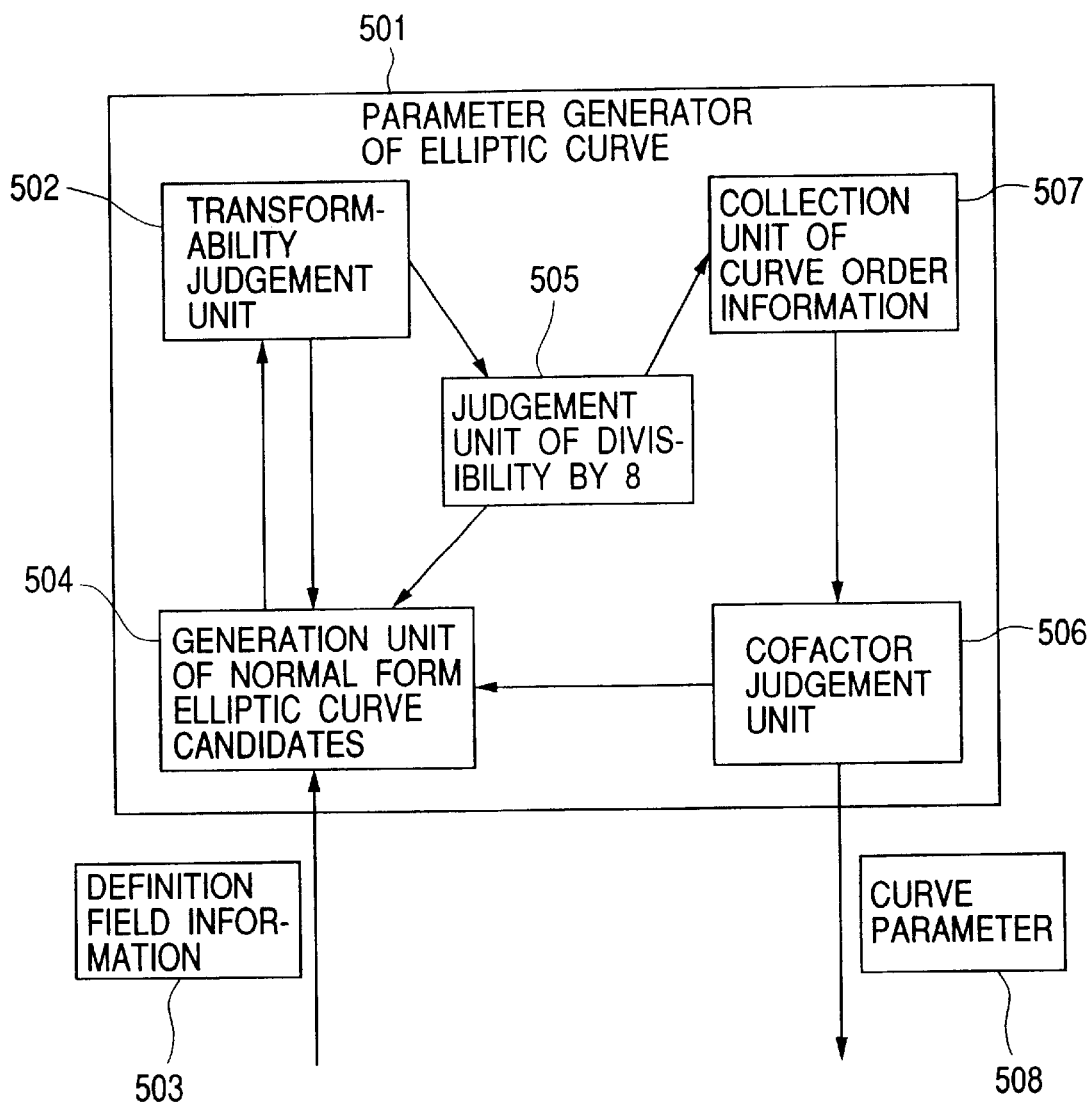
FIG. 5 is a diagram showing a flow of processes performed in a method and an apparatus for generating an elliptic curve in a curve parameter generation server in an elliptic curve cryptosystem according to the second embodiment of the present invention.
Figure 6:
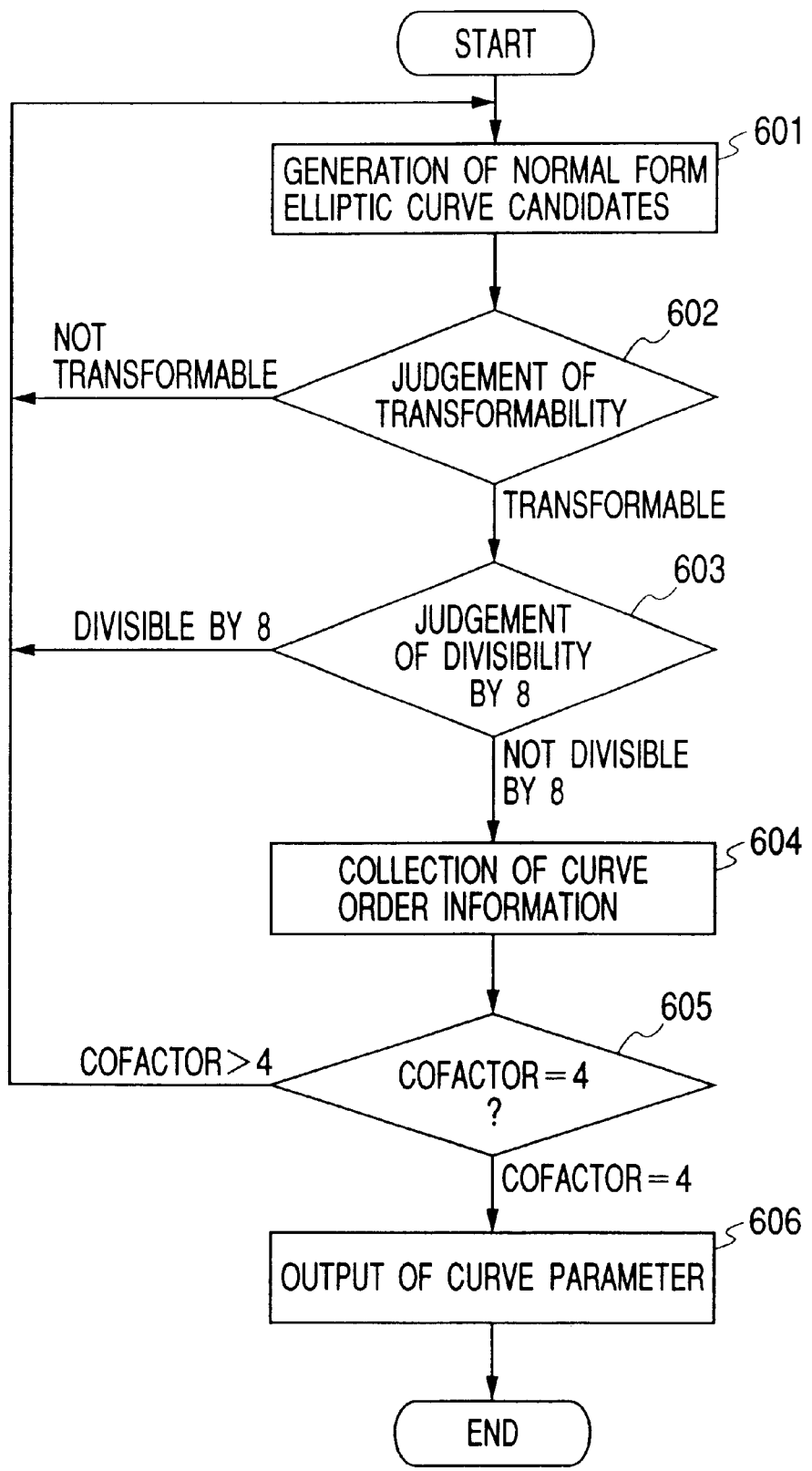
FIG. 6 is a flowchart showing a method for generating a normal form elliptic curve whose cofactor is 4 and which can be transformed to a Montgomery type elliptic curve, this method being included in a method and an apparatus for generating an elliptic curve according to the second embodiment of the present invention.

FIG. 5 is a diagram showing a method for generating a normal form elliptic curve whose curve order is 4× a prime number, that is, whose cofactor is 4 and which can be transformed to a Montgomery type elliptic curve in a curve parameter generation server in an elliptic curve cryptosystem according to the second embodiment of the present invention. FIG. 6 is a flowchart showing a method for generating the curve parameters of a normal form elliptic curve whose cofactor is 4 and which can be transformed to a Montgomery type elliptic curve in a parameter generator of elliptic curve 501 according to the second embodiment. As described above, when a normal form elliptic curve can be transformed to a Montgomery type elliptic curve, its curve order is a multiple of 4. However, to attain high safety, a curve order of (4× a prime number) is preferably selected from among possible curve order values.

A parameter generator of elliptic curve 501 receives definition field information 503 and outputs curve parameters 508 using the following procedure. Here, as the definition field information 503, either definition field information 2701, which includes the bit length of the definition field, or definition field information 2704, which includes the characteristic prime of the definition field, is given as shown in FIG. 27. At step 601, a generation unit of normal form elliptic curve candidates 504 randomly generates a normal form elliptic curve based on the definition field information 503. At step 602, the transformability judgement unit 502 determines whether a normal form elliptic curve generated by the generation unit of normal form elliptic curve candidates can be transformed to a Montgomery type elliptic curve. If it cannot be transformed to a Montgomery type elliptic curve, the generation unit of normal form elliptic curve candidates 504 generates a normal form elliptic curve again and the same process is repeated until a normal form elliptic curve transformable to a Montgomery type elliptic curve is found. A judgement unit of divisibility by eight 505 determines whether the curve order of a normal form elliptic curve which has been determined to be transformable to a Montgomery type elliptic curve by the transformability judgement unit 502 is divisible by 8, at step 603. When the curve order of the above elliptic curve is divisible by 8, the generation unit of normal form elliptic curve candidates 504 generates a normal form elliptic curve again and by following the above procedure again, the judgement unit of divisibility by eight 505 determines whether the curve order of the normal form elliptic curve transformable to a Montgomery type elliptic curve is divisible by 8. The same procedure is repeated until it is determined that a curve order cannot be divided by 8. When a curve order cannot be divided by 8, a collection unit of curve order information 507 collects information on the curve order of the normal form elliptic curve which can be transformed to a Montgomery type elliptic curve and which cannot be divided by 8, at step 604. At step 605, a cofactor judgement unit 506 determines whether the cofactor is 4 based on the curve order information obtained from the collection unit of curve order information 507. If it is determined that the cofactor exceeds 4, the generation unit of normal form elliptic curve candidates 504 generates a normal form elliptic curve again. Then, by following the above procedure again, the cofactor judgement unit 506 determines whether the cofactor is 4 using information on the curve order of the normal form elliptic curve which can be transformed to a Montgomery type elliptic curve and whose curve order cannot be divided by 8. The same procedure is repeated until it is determined that the cofactor is 4. If the cofactor is 4, the cofactor judgement unit 506 outputs the normal form elliptic curve which has been generated using the above procedure and can be transformed to a Montgomery type elliptic curve and whose cofactor is 4, as curve parameters, at step 606.

Figure 7:
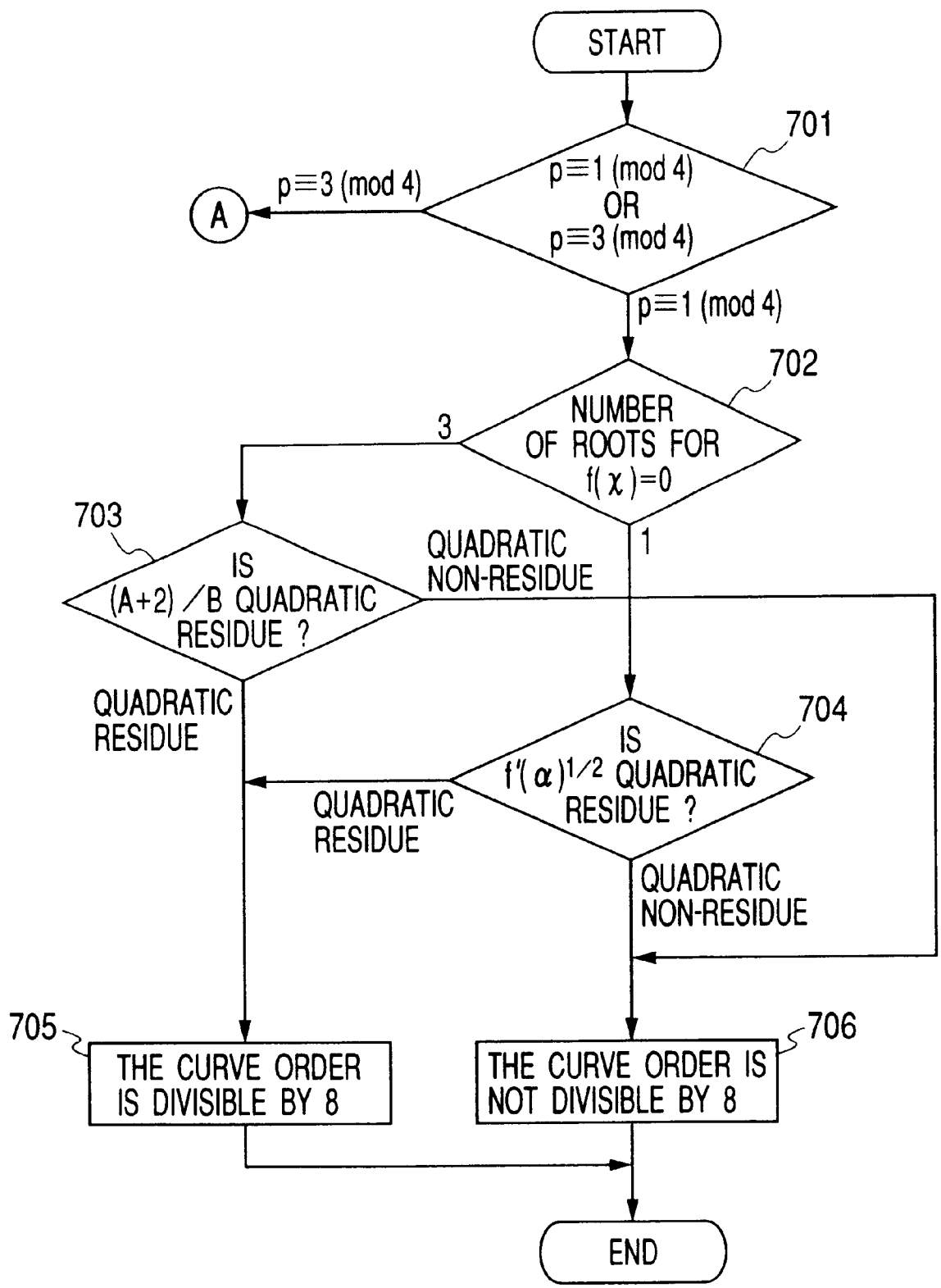
FIG. 7 is a flowchart showing a method for determining whether the curve order of a normal form elliptic curve transformable to a Montgomery type elliptic curve can be divided by 8, this method being provided in a parameter generator of elliptic curve according to the second embodiment of the present invention. The flowchart particularly shows determination of the divisibility when the characteristic prime of the definition field is congruent to 1 modulo 4.
Figure 8:
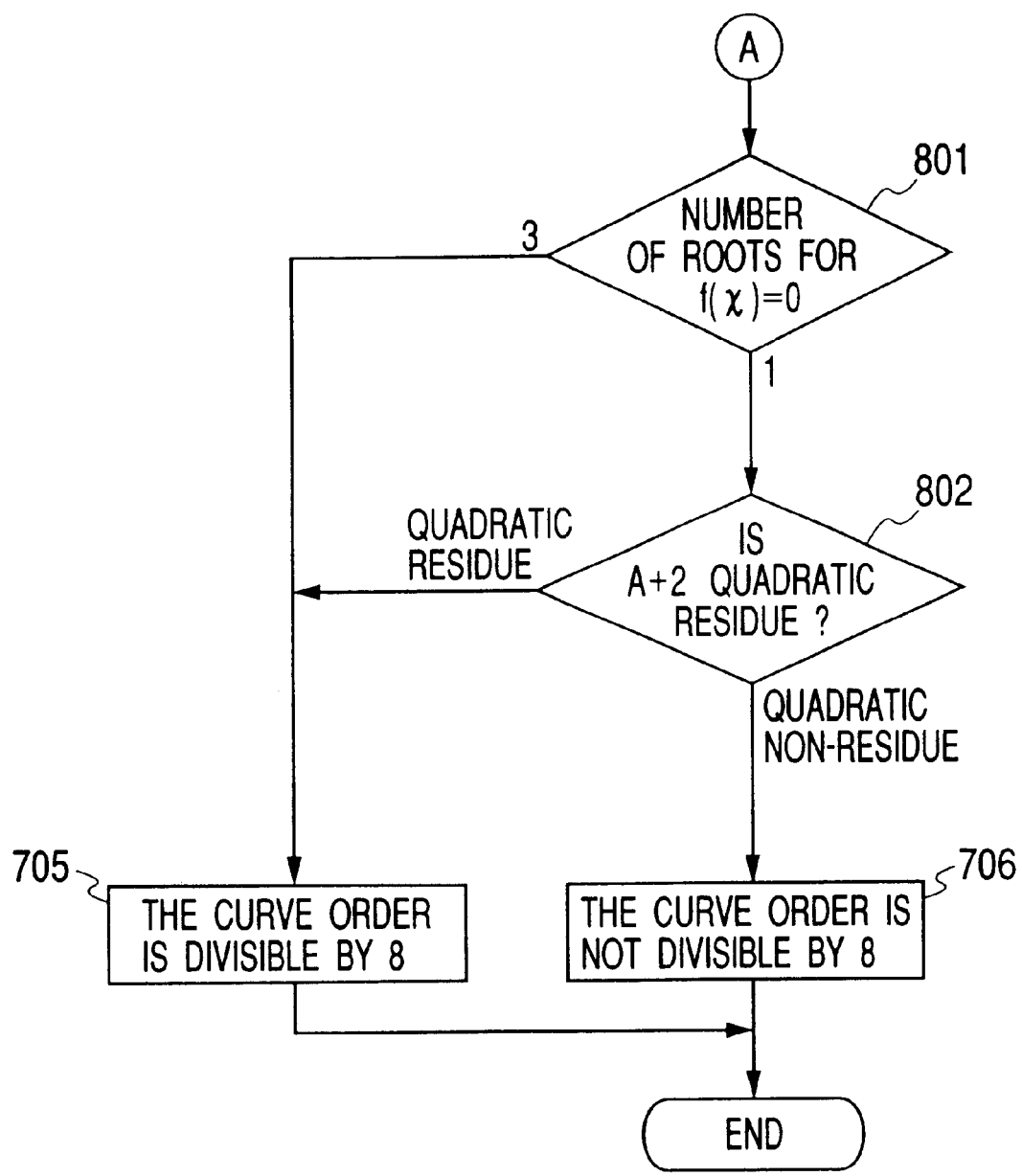
FIG. 8 is a flowchart showing a method for determining whether the curve order of a normal form elliptic curve transformable to a Montgomery type elliptic curve can be divided by 8, this method being provided in a parameter generator of elliptic curve according to the second embodiment of the present invention. The flowchart particularly shows determination of the divisibility when the characteristic prime of the definition field is congruent to 3 modulo 4.

The judgement unit of divisibility by eight 505 determines whether the curve order of a normal form elliptic curve transformable to a Montgomery type elliptic curve is divisible by 8 using the following procedure. FIGS. 7 and 8 are flowcharts showing a method for determining divisibility by 8 according to the second embodiment.

At step 701, the process flow is separated into two branches depending on whether the characteristic prime of a definition field is 1 modulo 4 or 3 modulo 4. If the characteristic prime of the definition field is 1 modulo 4, the process flow proceeds to step 702. If the characteristic prime of the definition field is 3 modulo 4, on the other hand, the process flow proceeds to step 801. At step 702, the process flow is separated into two branches depending on the number of roots of the equation $f(x)=0$ in $F_p$. If the number of roots is 1, the process flow proceeds to step 704, while if the number of roots is 3, the process flow proceeds to step 703. At step 703, it is determined whether $(A+2)/B$ is a quadratic residue in $F_p$. If it is a quadratic residue, the curve order can be divided by 8 at step 705. If it is a quadratic non-residue, the curve order cannot be divided by 8 at step 706. At step 704, it is determined whether $f(\alpha)^{1/2}$ is a quadratic residue in $F_p$. If it is a quadratic non-residue, the curve order cannot be divided by 8 at step 706. If it is a quadratic residue, on the other hand, the curve order can be divided by 8 at step 705. Thus, it can be determined whether a curve order can be divided by 8 when the characteristic prime of the definition field is 1 modulo 4. When the characteristic prime of the definition field is 3 modulo 4, the process flow is separated into two branches depending on the number of roots of the equation $f(x)=0$ in $F_p$ at step 801. If the number of roots is 1, the flow proceeds to step 802. If the number of roots is 3, the curve order can be divided by 8 at step 705. At step 802, it is determined whether $A+2$ is a quadratic residue in $F_p$. If it is a quadratic non-residue, the curve order cannot be divided by 8 at step 706. If it is a quadratic residue, the curve order can be divided by 8 at step 705. Thus, it can be determined whether a curve order can be divided by 8 when the characteristic prime of the definition field is 3 modulo 4.

The basis of the possible formation of a judgment on exact-divisibility-by-8 of the curve order of a normal form elliptic curve transformable to a Montgomery elliptic curve in accordance with the procedure described above is explained as follows. Let the equation $By^2=X^3+AX^2+X$ represent a Montgomery elliptic curve obtained as a result of transformation of a normal form elliptic curve. First of all, let the number of roots of $f(x)=0$ in $F_p$ be 1. In this case, the only 2-order point on the normal form elliptic curve is a point $(\alpha, 0)$. Since the x coordinate of a 2-order point on the Montgomery elliptic curve is a root of the equation $X^3+AX^2+X=0$ in $F_p$ and the point $(0, 0)$ on the Montgomery elliptic curve corresponds to the point $(\alpha, 0)$ on the normal curve elliptic curve, the equation $X^2+AX+1=0$ does not have a root in $F_p$. Thus, the determinant $(A^2-4)$ is a quadratic non-residue in $F_p$. If the expression $(A+2)/B$ is a quadratic residue, coordinates $(1,\pm\gamma)$ each represents a 4-order point where the symbol $\gamma$ denotes a square root for the quadratic residue. If the expression $(A-2)/B$ is a quadratic residue, on the other hand, coordinates $(-1,\pm\gamma')$ each represents a 4-order point where the symbol $\gamma'$ denotes a square root for the quadratic residue. Since the determinant $(A^2-4)$ is a quadratic non-residue, one of the expressions $(A+2)/B$ and $(A-2)/B$ must be a quadratic residue. Thus, a 4-order point always exists in this case.

Assume that a point $(u, v)$ on the Montgomery elliptic curve is a 2-time point of another point $(w, z)$ on this curve. A tangential line passing through the point $(w, z)$ is represented by an equation of $Y=((3w^2+2Aw+1)/2Bz)(X-w)+z$. Since the tangential line crosses the curve at a point $(u, -v)$, u and $-v$ satisfy the equation $Y=((3w^2+2Aw+1)/2Bz)(X-w)+z$. Thus, substituting u and $-v$ respectively for X and Y in the equation $Y=((3w^2+2Aw+1)/2Bz)(X-w)+z$, multiplying the expressions on both the sides of the equal sign '=' of the result of the substitution with $2Bz$ and squaring the products on both the sides obtained as results of the multiplication produce an equation of $4Bv^2Bz^2=((3w^2+2Aw+1)(u-w)+2Bz^2)^2$. Since the points $(w, z)$ and $(u, -v)$ exist on the curve, equations $Bz^2=w^3+Aw^2+w$ and $Bv^2=u^3+Au^2+u$ hold true. Substituting $(w^3+Aw^2+w)$ and $(u^3+Au^2+u)$ respectively for $Bz^2$ and $Bv^2$ in the equation $4Bv^2Bz^2=((3w^2+2Aw+1)(u-w)+2Bz^2)^2$ results in an equation of $4(w^3+Aw^2+w)(u^3+Au^2+u)=((3w^2+2Aw+1)(u-w)+2(w^3+Aw^2+w))^2$. Since the tangential line is tangential to the curve at the point $(w, z)$ and, in addition, the value of w is different from that of u, division by $(u-w)^2$ is possible, resulting in an equation of $(3w^2+2Aw+1)^2-4(w^3+Aw^2+w)(u+A+2w)=0$. The equation $(3w^2+2Aw+1)^2-4(w^3+Aw^2+w)(u+A+2w)=0$ is rearranged to give an equation of w as follows: $w^4-4uw^3-(4Au+2)w^2-4uw+1=0$. Since w is not equal to 0, the expression can be divided by $w^2$ to result in an equation of $(w+1/w)$ as follows: $(w+1/w)^2-4u(w+1/w)-4(Au+1)=0$. Assume that $w \in F_p$. In this case, $1/w \in F_p$ and $(w+1/w) \in F_p$. In order for the above equation of $(w+1/w)$ to have a root in $F_p$, the discriminant $4(u^2+Au+1)$ must be a quadratic residue.

Let the symbol $\epsilon$ denote one of the square roots of the equation $u^2+Au+1=0$. In this case, the following equation holds true: $(w+1/w)=2(u\pm\epsilon)$. In order for the equation $(w+1/w)=2(u\pm\epsilon)$ of w to have a root in $F_p$, the discriminant $((u\pm\epsilon)^2-1)$ must be a quadratic residue. Since an equation of $((u+\epsilon)^2-1)((u-\epsilon)^2-1)=u^2(A^2-4)$ holds true and the expression $(A^2-4)$ is a quadratic non-residue, only either an expression of $((u+\epsilon)^2-1)$ or an expression of $((u-\epsilon)^2-1)$ is a quadratic residue. In this case, the following equation holds true: $w=(u\pm\epsilon)\pm\sqrt{((u\pm\epsilon)^2-1)}$. Let the symbol $\delta$ denote $(u\pm\epsilon)$. In this case, the following equation holds true: $w^2+Aw+1=(2\delta+A)(\delta\pm\sqrt{(\delta^2-1)})$ and, hence, the following equation holds true: $Bz^2=(2\delta+A)(\delta+\sqrt{(\delta^2-1)})^2$. In order for z to satisfy $z \in F_p$, an expression of $(2\delta+A)/B$ must be a quadratic residue. Also in this case, since the equation $(2(u+\epsilon)+A)(2(u-\epsilon)+A)=A^2-4$ holds true, only either an expression of $(2(u+\epsilon)+A)/B$ or an expression of $(2(u-\epsilon)+A)/B$ is a quadratic residue. If the same signs are used for both in an alternative condition for the quadratic residues, $w, z \in F_p$. If the above equation is rewritten into an equation of $(u\pm\epsilon)^2-1=u(2(u\pm\epsilon)+A)$, the following equation holds true: $((u\pm\epsilon)^2-1)((2(u\pm\epsilon)+A)/B)=(u/B)(2(u\pm\epsilon)+A)^2$. Thus if an expression of $u/B$ is a quadratic residue, the same signs can be used for both in an alternative condition for the quadratic residues, implying that a point $(w, z)$ becoming a 2-time point $(u, v)$ exists. To sum up, the above description indicates that, if expressions $(u^2+Au+1)$ and $u/B$ are both a quadratic residue, a point $(w, z)$ becoming a 2-time point $(u, v)$ exists.

x coordinates of 4-order points are $\pm 1$. Thus, the existence of an 8-order point can be indicated by whether or not expressions $A\pm 2$, B and $-1$ are quadratic residues.

The value $-1$ is a quadratic residue if the characteristic prime of a definition field is 1 modulo 4. On the other hand, the value $-1$ is a quadratic non-residue if the characteristic prime of a definition field is 3 modulo 4. Whether an expression of $A^2-4$ is a quadratic residue or a quadratic non-residue is determined in dependence on whether the number of roots of $f(x)=0$ is 1 or 3. The sum of the curve order of an original and the curve order of its twist is $2(p+1)$. Thus, in the case that the number of roots of $f(x)=0$ is 3, when the characteristic prime of a definition field is 1 modulo 4, if the curve order of an original can be divided by 8, the curve order of the twist cannot be divided by 8 and, if the curve order of an original cannot be divided by 8, on the contrary, the curve order of the twist can be divided by 8. When the characteristic prime of a definition field is 3 modulo 4, on the other hand, if the curve order of an original can be divided by 8, the curve order of its twist can also be divided by 8 and, if the curve order of an original cannot be divided by 8, on the contrary, the curve order of its twist cannot be divided by 8 as well. The above description can be summarized into a table shown in FIG. 9. After judgments are formed in accordance with the procedures represented by the flowcharts shown in FIGS. 7 and 8, a judgment on the exact-divisibility-by-8 of a curve order can be made in accordance with the table shown in FIG. 9.

In the method of a judgment on the exact divisibility by 8, the formation of a judgment as to whether or not an expression of $A+2$ is a quadratic residue at the step 802 can be based on the outcome of a judgment as to whether or not an expression of $A-2$ is a quadratic residue. If the number of roots of the equation $f(x)=0$ is 1, an expression of $(A^2-4)$ is a quadratic non-residue. Thus, if the expression $(A+2)$ is a quadratic residue, the expression $(A-2)$ is a quadratic non-residue and, if the expression $(A+2)$ is a quadratic non-residue, the expression $(A-2)$ is a quadratic residue. In this way, the formation of a judgment as to whether or not the expression $A+2$ is a quadratic residue at the step 703 can be based on the outcome of a judgment as to whether or not the expression $A-2$ is a quadratic residue. If the number of roots of the equation $f(x)=0$ is 3, on the other hand, the expression $(A^2-4)$ is a quadratic residue. Thus, if an expression of $(A+2)/B$ is a quadratic residue, an expression of $(A-2)/B$ is also a quadratic residue and, if the expression $(A+2)/B$ is a quadratic non-residue, the expression $(A-2)/B$ is also a quadratic non-residue. In this way, the formation of a judgment as to whether or not the expression $(A+2)/B$ is a quadratic residue at the step 703 can be based on the outcome of a judgment as to whether or not the expression $(A-2)/B$ is a quadratic residue. The formation of a judgment as to whether or not an expression of $f'(\alpha)^{1/2}$ is a quadratic residue at the step 704 can also be based on the outcome of a judgment as to whether or not B is a quadratic residue. This is because if the expression f'(α)^{1/2} is a quadratic residue, B is also a quadratic residue and, if the expression f'(α)^{1/2} is a quadratic non-residue, B is also a quadratic non-residue.

In the second embodiment, an implementation with a cofactor of 4 is an optimum implementation wherein the method of a judgment on the exact divisibility by 8 is adopted. It should be noted, however, that the scope of the present invention is not limited to this implementation. For example, it is also possible to use an integer that is derived from a relation of 'the curve order=the cofactor×a prime number'.

The method described using FIG. 4 as an application to the first embodiment also can be applied to the second embodiment.

Next, description will be made of a method for generating a normal form elliptic curve according to a third embodiment.

Figure 10:
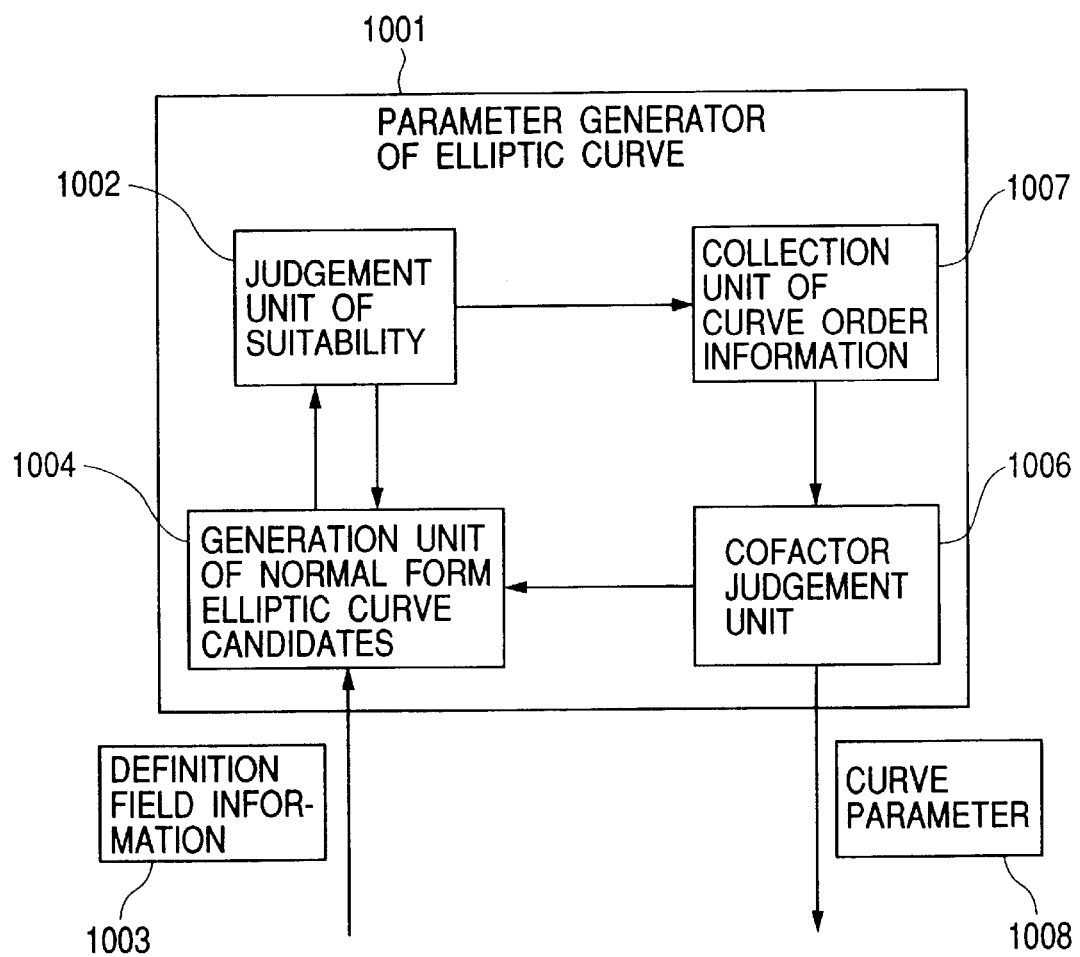
FIG. 10 is a diagram showing a flow of processes performed in a method and an apparatus for generating an elliptic curve in a curve parameter generation server in an elliptic curve cryptosystem according to a third embodiment of the present invention.
Figure 11:
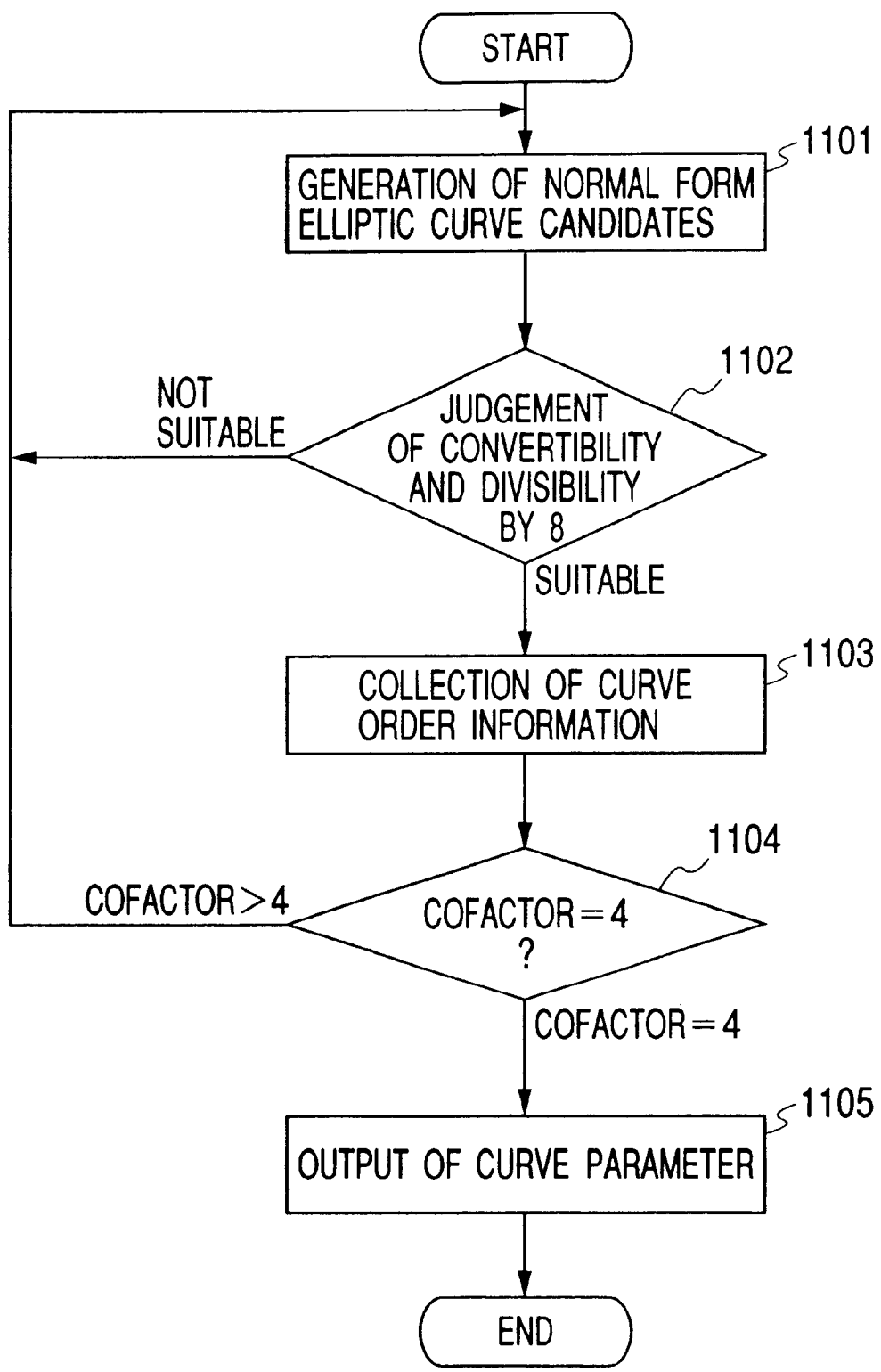
FIG. 11 is a flowchart showing a method for generating a normal form elliptic curve whose cofactor is 4 and which can be transformed to a Montgomery type elliptic curve, this method being included in a method and an apparatus for generating an elliptic curve according to the third embodiment of the present invention.

FIG. 10 is a diagram showing a method for generating a normal form elliptic curve whose curve order is 4×a prime number, that is, whose cofactor is 4, and which can be transformed to a Montgomery type elliptic curve in a curve parameter generation server in an elliptic curve cryptosystem according to the third embodiment. FIG. 11 is a flowchart showing a method for generating the curve parameters of a normal form elliptic curve whose cofactor is 4 and which can be transformed to a Montgomery type elliptic curve in a parameter generator of elliptic curve 1001 according to the third embodiment.

A parameter generator of elliptic curve 1001 receives definition field information 1003 and outputs curve parameters 1008 using the following procedure. Here, as the definition field information 1003, either definition field information 2701, which includes the bit length of the definition field, or definition field information 2704, which includes the characteristic prime of the definition field, is given as shown in FIG. 27. At step 1101, a generation unit of normal form elliptic curve candidates 1004 randomly generates a normal form elliptic curve based on the definition field information 1003. At step 1102, a judgement unit of suitability 1002 determines whether a normal form elliptic curve generated by the generation unit of normal form elliptic curve candidates 1004 and its twist normal form elliptic curve can be transformed to Montgomery type elliptic curves and the curve order of each curve can be divided by 8. If they are not transformable, or the curve orders of both the original and the twist normal form elliptic curves are divisible by 8 even if they are transformable, the generation unit of normal form elliptic curve candidates 1004 generates a normal form elliptic curve again. Then, the same procedure is repeated until it is determined that both the original and the twist normal form elliptic curves can be transformed to Montgomery type elliptic curves and the curve order of one of the original and the twist normal form elliptic curves is not divisible by 8. When both the original and the twist normal form elliptic curves can be transformed to Montgomery type elliptic curves and the curve order of one of the original and the twist normal form elliptic curves is not divisible by 8, a collection unit of curve order information 1007 collects information on the curve order of a normal form elliptic curve which can be transformed to a Montgomery type elliptic curve whose curve order or the curve order of whose twist is not divisible by 8, at step 1103. At step 1104, a cofactor judgement unit 1006 judges whether the cofactor is 4 based on the curve order information obtained from the collection unit of curve order information 1007. If the cofactor exceeds 4, the generation unit of normal form elliptic curve candidates 1004 generates a normal form elliptic curve again. Then, by following the above procedure again, the cofactor judgement unit 1006 determines whether the cofactor is 4 using information on the curve order of the normal form elliptic curve which can be transformed to a Montgomery type elliptic curve and whose curve order cannot be divided by 8. The same procedure is repeated until it is determined that the cofactor is 4. If the cofactor is 4, the cofactor judgement unit 1006 outputs the normal form elliptic curve which has been generated using the above procedure and can be transformed to a Montgomery type elliptic curve and whose cofactor is 4, as curve parameters, at step 1105.

Figure 12:
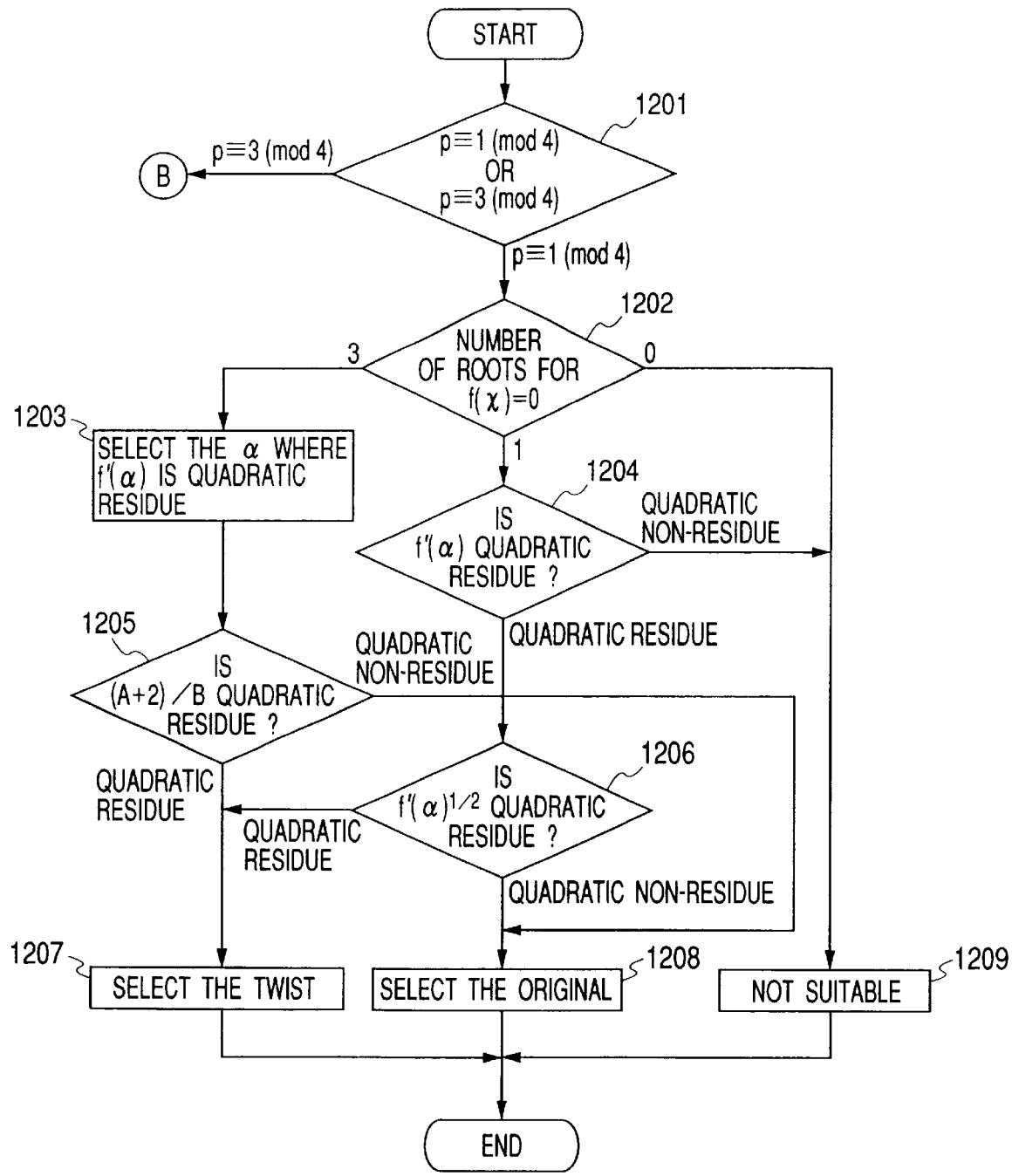
FIG. 12 is a flowchart showing a method for judging whether a normal form elliptic curve is suitable according to the third embodiment of the present invention. The flowchart particularly shows determination of the suitability when the characteristic prime of the definition field is congruent to 1 modulo 4.
Figure 13:
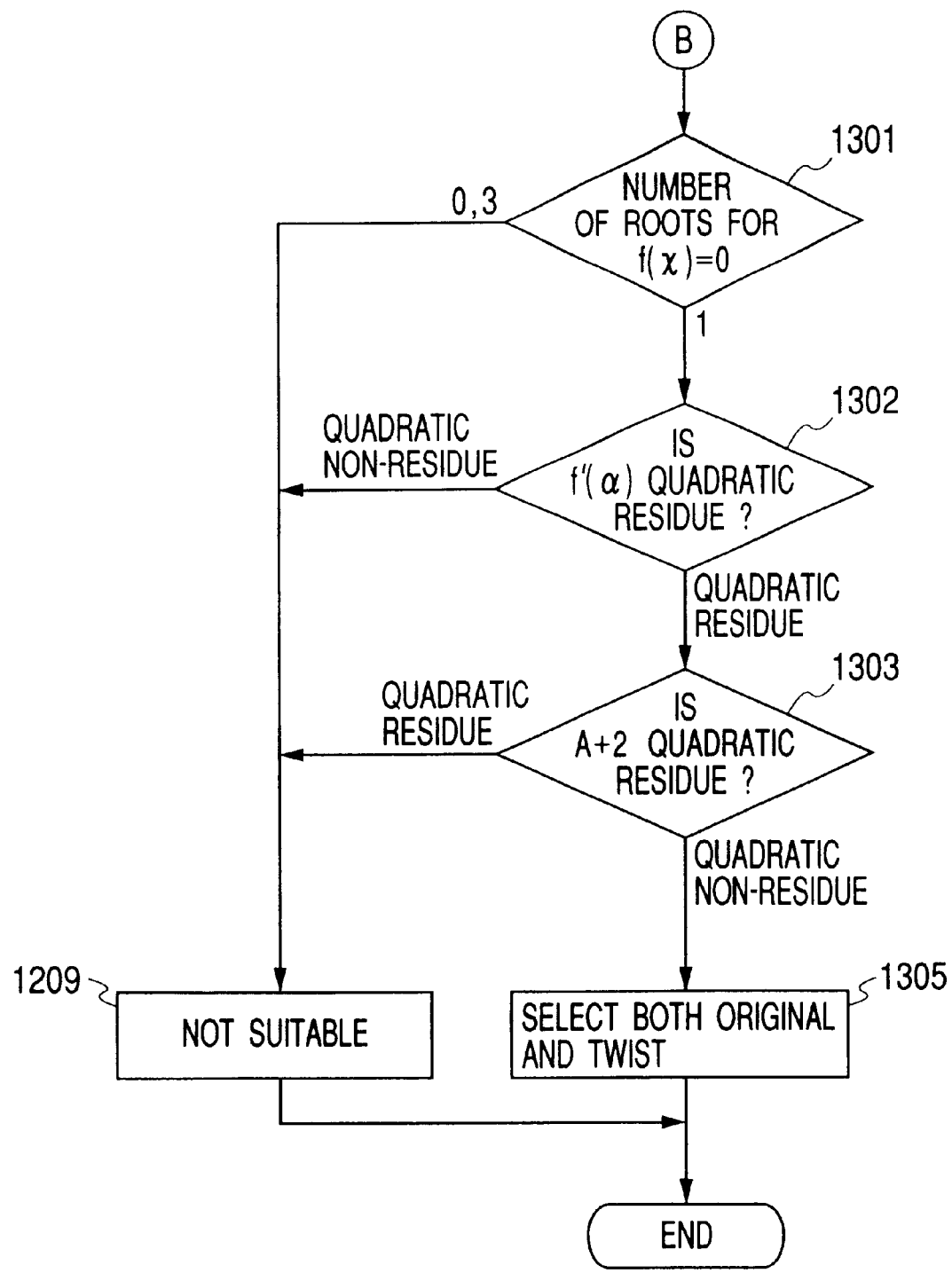
FIG. 13 is a flowchart showing a method for judging whether a normal form elliptic curve is suitable according to the third embodiment of the present invention. The flowchart particularly shows determination of the suitability when the characteristic prime of the definition field is congruent to 3 modulo 4.

The judgement unit of suitability 1002 judges whether a given normal form elliptic curve and its twist normal form elliptic curve can be transformed to Montgomery type elliptic curves and the curve order of each curve can be divided by 8. FIGS. 12 and 13 are flowcharts showing a method for determining suitability of a normal form elliptic curve according to the third embodiment.

At step 1201, the process flow is separated into two branches depending on whether the prime number of a definition field is 1 modulo 4 or 3 modulo 4. If the characteristic prime of the definition field is 1 modulo 4, the process flow proceeds to step 1202. If the characteristic prime of the definition field is 3 modulo 4, on the other hand, the process flow proceeds to step 1301. At step 1202, the process flow is separated into two branches depending on the number of roots of the equation f(x)=0 in $F_p$. If the number of roots is 1, the process flow proceeds to step 1204, while if the number of roots is 3, the process flow proceeds to step 1203. If the equation f(x)=0 has no root in $F_p$, both the original and the twist normal form elliptic curves cannot be transformed to Montgomery type elliptic curves and therefore are not suitable, at step 1209. Step 1203 selects α for which f(α)=0 and f'(α) is a quadratic residue in $F_p$. For this α, a normal form elliptic curve can be transformed to a Montgomery type elliptic curve. At step 1205, it is determined whether (A+2)/B is a quadratic residue in $F_p$. If it is a quadratic residue, the original normal form elliptic curve can be divided by 8 but the twist normal form elliptic curve cannot be divided by 8. Therefore, the twist is selected at step 1207. If it is a quadratic non-residue, on the other hand, the twist normal form elliptic curve can be divided by 8 but the original normal form elliptic curve cannot be divided by 8. Therefore, the original is selected at step 1208. At step 1204, it is determined whether f'(α) is a quadratic residue in $F_p$. If it is a quadratic non-residue, both the original and the twist normal form elliptic curves cannot be transformed to Montgomery type elliptic curves, and therefore are not suitable, at step 1209. If it is a quadratic residue, the process flow proceeds to step 1206. In this case, the normal form elliptic curve can be transformed to a Montgomery type elliptic curve. At step 1206, it is determined whether f'(α)^{1/2} is a quadratic residue in $F_p$. If it is a quadratic non-residue, the twist normal form elliptic curve can be divided by 8, while the original normal form elliptic curve cannot be divided by 8. Therefore, the original is selected at step 1208. If it is a quadratic residue, the original normal form elliptic curve can be divided by 8, while the twist normal form elliptic curve cannot be divided by 8. Therefore, the twist is selected at step 1207. As described above, in the case where the characteristic prime of the definition field is 1 modulo 4, it is possible to select a normal form elliptic curve which can be transformed to a Montgomery type elliptic curve and whose curve order is not divisible by 8 when an original and its twist normal form elliptic curves are given. Alternatively, it can be determined that given curves should be discarded when they are not suitable. When the characteristic prime of the definition field is 3 modulo 4, the process flow is separated into two branches depending on the number of roots of the equation $f(x)=0$ in $F_p$ at step 1301. If the number of roots is 1, the process flow proceeds to step 1302. If the number of roots is 3, or the equation $f(x)=0$ has no root in $F_p$, both a given original and its twist normal form elliptic curves are not transformable, or the curve orders of both curves are divisible by 8 even if they are transformable. Therefore, they are not suitable at step 1209. At step 1302, it is determined whether $f'(\alpha)$ is a quadratic residue in $F_p$. If it is a quadratic non-residue, both the original and the twist normal form elliptic curves are not transformable, and therefore are not suitable, at step 1209. If it is a quadratic residue, the process flow proceeds to step 1303. In this case, both the given original and twist normal form elliptic curves can be transformed to Montgomery type elliptic curves. At step 1303, it is determined whether $A+2$ is a quadratic residue in $F_p$. If it is a quadratic non-residue, both the original and the twist normal form elliptic curves are not divisible by 8, and therefore both the original and the twist are selected at step 1305. If it is a quadratic residue, both the original and the twist normal form elliptic curves are divisible by 8, and therefore they are not suitable at step 1209. As described above, in the case where the prime number of a definition field is 3 modulo 4, it is possible to select a normal form elliptic curve which can be transformed to a Montgomery type elliptic curve and whose curve order is not divisible by 8 when an original and its twist normal form elliptic curves are given. Alternatively, it can be determined that given curves should be discarded when they are not suitable.

Based on the following reason, it is possible to select a normal form elliptic curve which can be transformed to a Montgomery type elliptic curve and whose curve order is not divisible by 8 when an original and its twist normal form elliptic curves are given, or the given curves can be discarded when they are not suitable, by using the above procedures. In the flowcharts shown in FIGS. 12 and 13, it is determined whether a normal form elliptic curve can be transformed to a Montgomery type elliptic curve at the first half of the step flow, while it is determined whether the curve order of a normal form elliptic curve transformable to a Montgomery type elliptic curve is divisible by 8 based on FIG. 9, at the second half of the step flow. It should be noted that when comparing the Montgomery type elliptic curve for the original normal form elliptic curve and the Montgomery type elliptic curve for the twist normal form elliptic curve, if the coefficient of $y^2$ of the former Montgomery type elliptic curve is a quadratic residue, the coefficient of $y^2$ of the latter is a quadratic non-residue, and vice versa. At step 1203, $\alpha$ for which $f'(\alpha)$ is a quadratic residue can always be selected, based on the following reason. When the discriminant of $f(x)$ is denoted by $\Delta$, $\Delta$ is a quadratic residue if the equation $f(x)=0$ has 3 roots. On the other hand, when the roots of the equation $f(x)=0$ are denoted by $\alpha$, $\beta$, and $\gamma$, $\Delta=-16f'(\alpha)f'(\beta)f'(\gamma)$. Accordingly, at least one of $f'(\alpha)$, $f'(\beta)$, and $f'(\gamma)$ is a quadratic residue.

Next, description will be made of an elliptic curve cryptosystem which incorporates an apparatus for generating a safe normal form elliptic curve transformable to a Montgomery type elliptic curve according to a fourth embodiment, with reference to FIG. 14.

A curve parameter generation server 1401 incorporates the parameter generator of elliptic curve 101 of the first embodiment for generating a safe normal form elliptic curve transformable to a Montgomery type elliptic curve. A computer A1402 generates a pair of private and public keys to carry out cryptocommunications by elliptic curve cryptography using a Montgomery type elliptic curve. A public key server 1403 registers the public key of each computer, and receives a public key inquiry and transmits the public key of a specified computer. A computer B1404 carries out cryptocommunications with the computer A1402 by elliptic curve cryptography using a Montgomery type elliptic curve.

Figure 15:
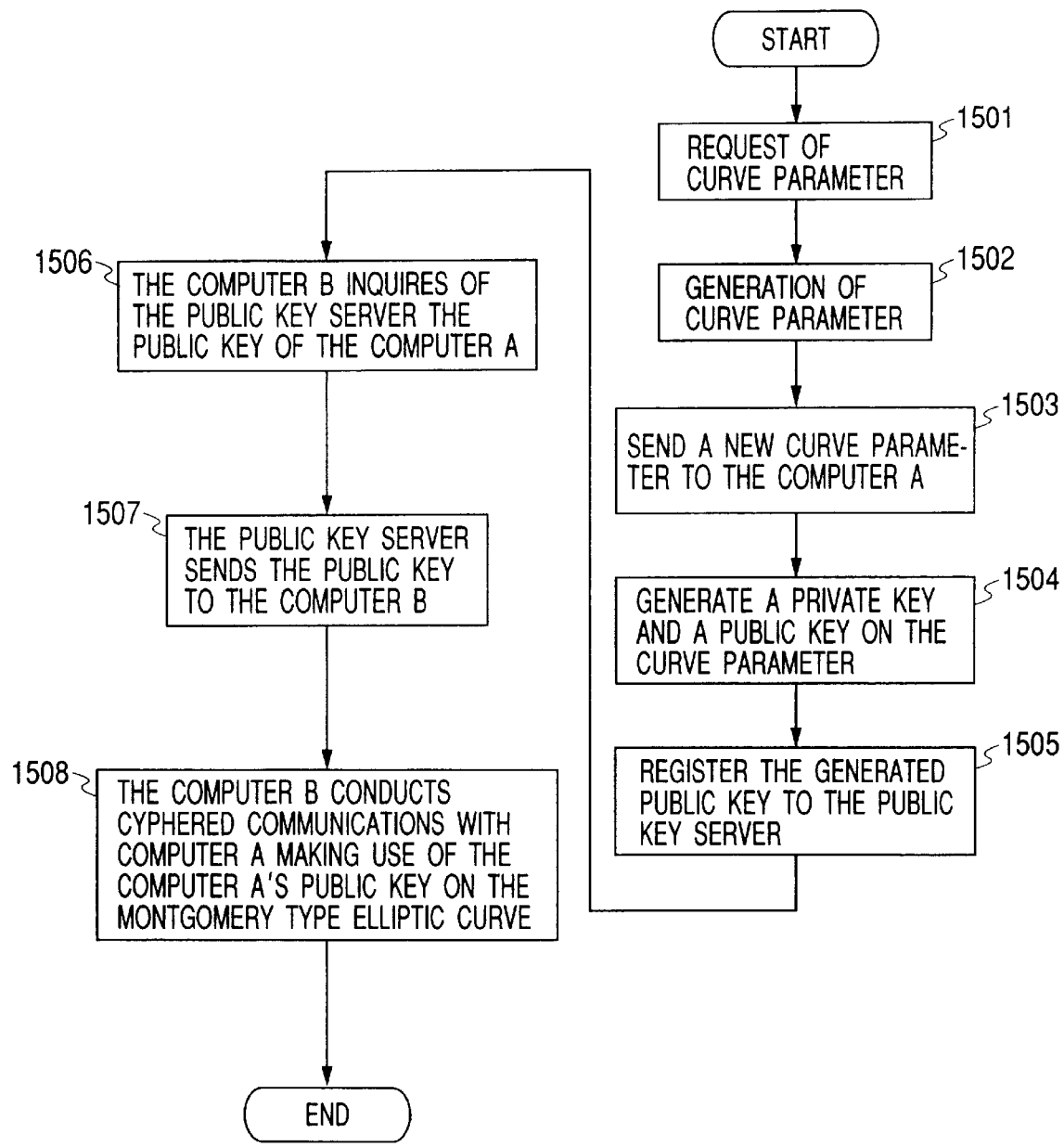
FIG. 15 is a flowchart showing a method for generating a curve in an elliptic curve cryptosystem according to a fourth embodiment of the present invention.

According to the fourth embodiment, an elliptic curve cryptosystem carries out cryptocommunications by utilizing the parameter generator of elliptic curve using the following procedure as shown by the flowchart in FIG. 15. The computer A1402 asks the curve parameter generation server 1401 to generate a safe normal form elliptic curve transformable to a Montgomery type elliptic curve at step 1501. Based on the above request for generation of the curve, the curve parameter generation server 1401 generates the curve parameters 108 by supplying the definition field information 103 to the parameter generator of elliptic curve 101, at step 1502. Here, as the definition field information 103, either definition field information 2701, which includes the bit length of the definition field, or definition field information 2704, which includes the characteristic prime of the definition field, is given as shown in FIG. 27. As new curve parameters, the curve parameter generation server 1401 supplies to the computer A1402 the defining equation and the curve order of a normal form elliptic curve transformable to a Montgomery type elliptic curve, and the defining equation of a Montgomery type elliptic curve obtained by transforming the normal form elliptic curve as well as the x coordinate of a 2-order point on the normal form elliptic curve corresponding to the point (0,0) on the Montgomery type elliptic curve, at step 1503. The computer A1402 generates a pair of private and public keys based on the given new curve parameters at step 1504. The computer A1402 registers the above generated public key in the public key server 1403 at step 1505. The computer B1404 inquires of the public key server 1403 about the public key of the computer A1402 at step 1506. Based on the public key inquiry made by the computer B1404, the public key server 1403 supplies the public key of the computer A1402 to the computer B1404 at step 1507. The computer B1404 performs encryption operation with the public key of the computer A1402 by utilizing a Montgomery type elliptic curve to carry out cryptocommunications with the computer A1402 at step 1508.

Figure 16:
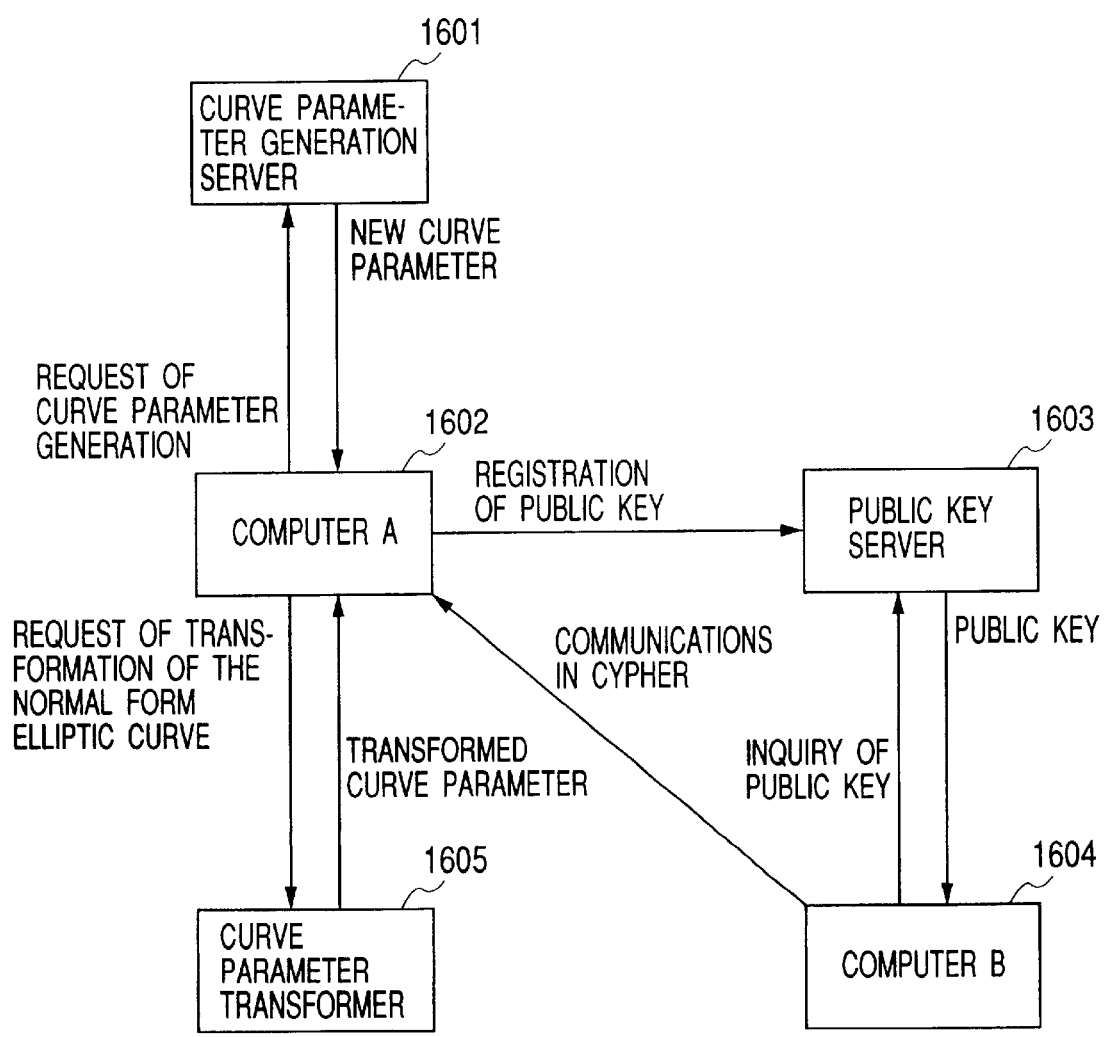
FIG. 16 is a configurational diagram of an elliptic curve cryptosystem according to a fifth embodiment of the present invention.

FIG. 16 is a diagram showing an elliptic curve cryptosystem which incorporates an apparatus for generating a safe normal form elliptic curve transformable to a Montgomery type elliptic curve according to a fifth embodiment.

A curve parameter generation server 1601 incorporates the parameter generator of elliptic curve 101 of the first embodiment for generating a safe normal form elliptic curve transformable to a Montgomery type elliptic curve. A computer A1602 generates a pair of private and public keys to carry out cryptocommunications by elliptic curve cryptography using a Montgomery type elliptic curve. A public key server 1603 registers the public key of each computer, and receives a public key inquiry and transmits the public key of a specified computer. A computer B1604 carries out cryptocommunications with the computer A1602 by elliptic curve cryptography using a Montgomery type elliptic curve. A curve parameter transformer 1605 receives a normal form elliptic curve transformable to a Montgomery type elliptic curve, and outputs the Montgomery type elliptic curve corresponding to the normal form elliptic curve as well as the x coordinate of a 2-order point on the normal form elliptic curve corresponding to the point (0,0) on the Montgomery type elliptic curve.

Figure 17:
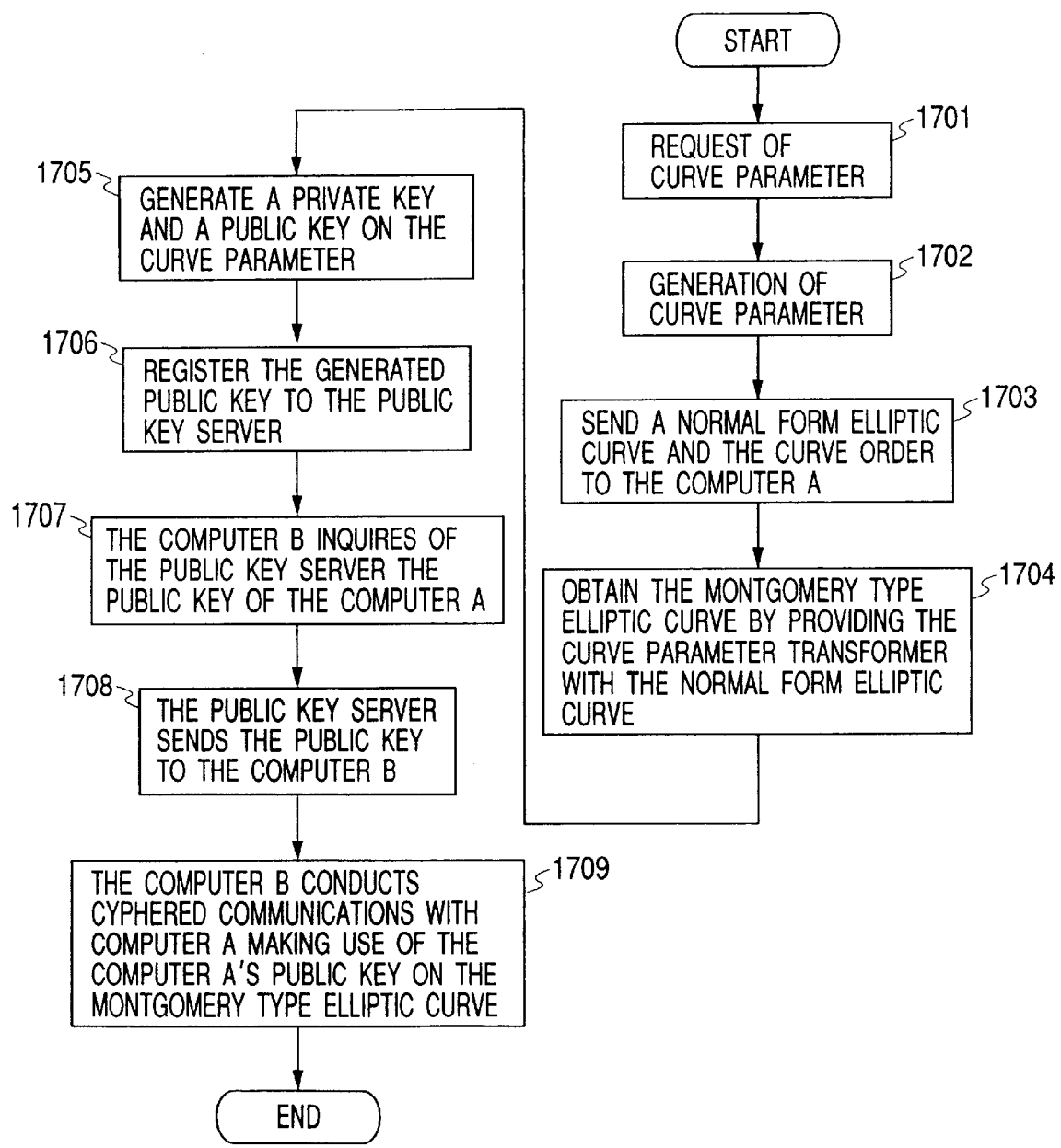
FIG. 17 is a flowchart showing a method for generating a curve in an elliptic curve cryptosystem according to the fifth embodiment of the present invention.

According to the fifth embodiment, an elliptic curve cryptosystem carries out cryptocommunications by utilizing the parameter generator of elliptic curve using the following procedure as shown by the flowchart in FIG. 17. The computer A1602 asks the curve parameter generation server 1601 to generate a safe normal form elliptic curve transformable to a Montgomery type elliptic curve at step 1701. Based on the above request for generation of the curve, the curve parameter generation server 1601 generates the curve parameters 108 by supplying the definition field information 103 to the parameter generator of elliptic curve 101, at step 1702. Here, as the definition field information 103, either definition field information 2701, which includes the bit length of the definition field, or definition field information 2704, which includes the characteristic prime of the definition field, is given as shown in FIG. 27. As new curve parameters, the curve parameter generation server 1601 supplies the defining equation and the curve order of a normal form elliptic curve transformable to a Montgomery type elliptic curve to the computer A1602 at step 1703. The computer A1602 supplies to the curve parameter transformer 1605 the defining equation of the normal form elliptic curve transformable to a Montgomery type elliptic curve, and receives from the curve parameter transformer 1605 the defining equation of a Montgomery type elliptic curve obtained by transforming the normal form elliptic curve transformable to a Montgomery type elliptic curve, and the x coordinate of a 2-order point on the normal form elliptic curve corresponding to the point (0,0) on the Montgomery type elliptic curve at step 1704. The computer A1602 generates a pair of private and public keys based on the above curve parameters at step 1705. The computer A1602 registers the above generated public key in the public key server 1603 at step 1706. The computer B1604 inquires of the public key server 1603 about the public key of the computer A1602 at step 1707. Based on the public key inquiry made by the computer B1604, the public key server 1603 supplies the public key of the computer A1602 to the computer B1604 at step 1708. The computer B1604 performs encryption operation with the public key of the computer A1602 by utilizing a Montgomery type elliptic curve to carry out cryptocommunications with the computer A1602 at step 1709.

Figure 18:
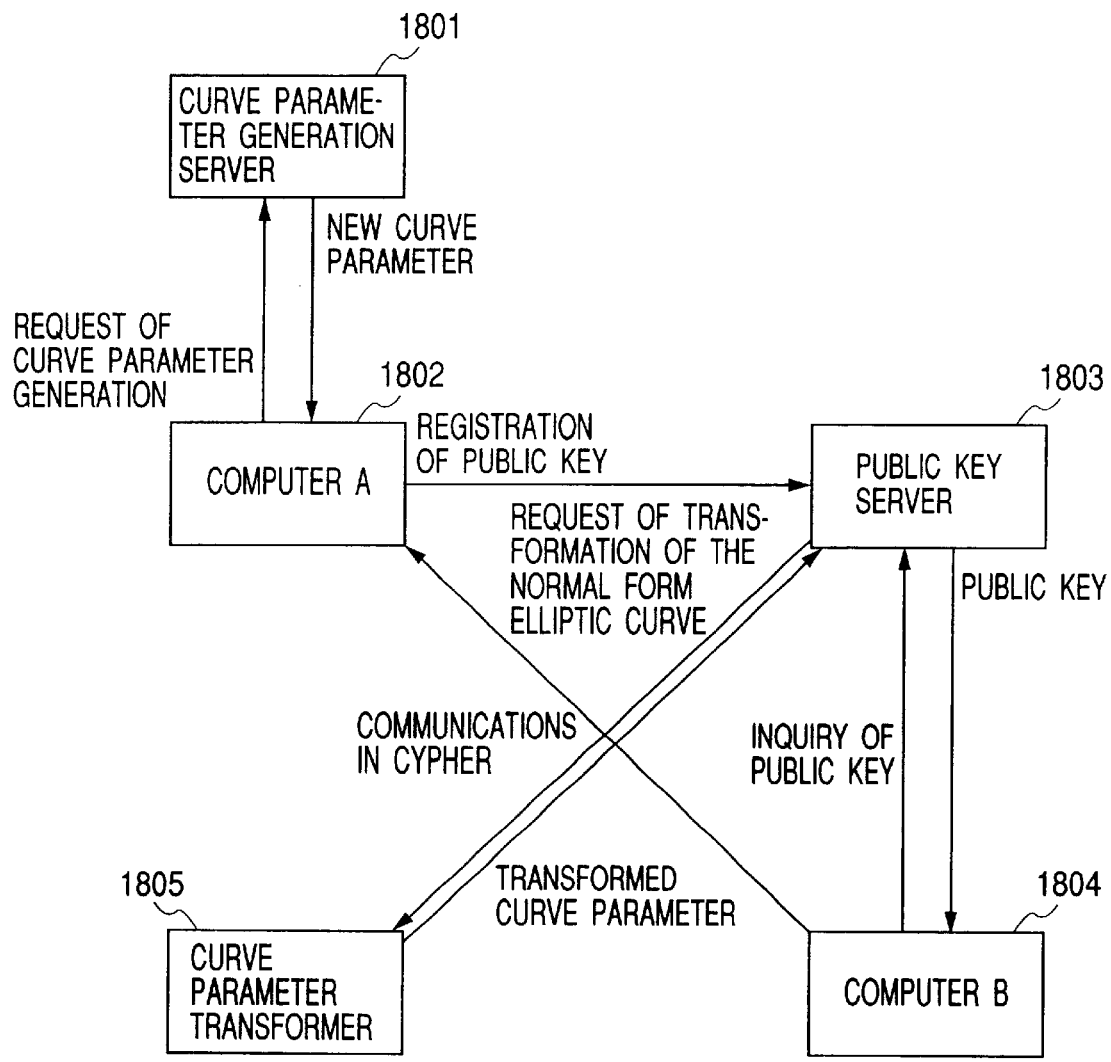
FIG. 18 is a configurational diagram of an elliptic curve cryptosystem according to a sixth embodiment of the present invention.

FIG. 18 is a diagram showing an elliptic curve cryptosystem which incorporates an apparatus for generating a safe normal form elliptic curve transformable to a Montgomery type elliptic curve according to a sixth embodiment.

A curve parameter generation server 1801 incorporates the parameter generator of elliptic curve 101 of the first embodiment for generating a safe normal form elliptic curve transformable to a Montgomery type elliptic curve. A computer A1802 generates a pair of private and public keys to carry out cryptocommunications by elliptic curve cryptography using a Montgomery type elliptic curve. A public key server 1803 registers the public key of each computer, and receives a public key inquiry and transmits the public key of a specified computer. A computer B1804 carries out cryptocommunications with the computer A1802 by elliptic curve cryptography using a Montgomery type elliptic curve. A curve parameter transformer 1805 receives a normal form elliptic curve transformable to a Montgomery type elliptic curve, and outputs the Montgomery type elliptic curve corresponding to the normal form elliptic curve as well as the x coordinate of a 2-order point on the normal form elliptic curve corresponding to the point (0,0) on the Montgomery type elliptic curve.

Figure 19:
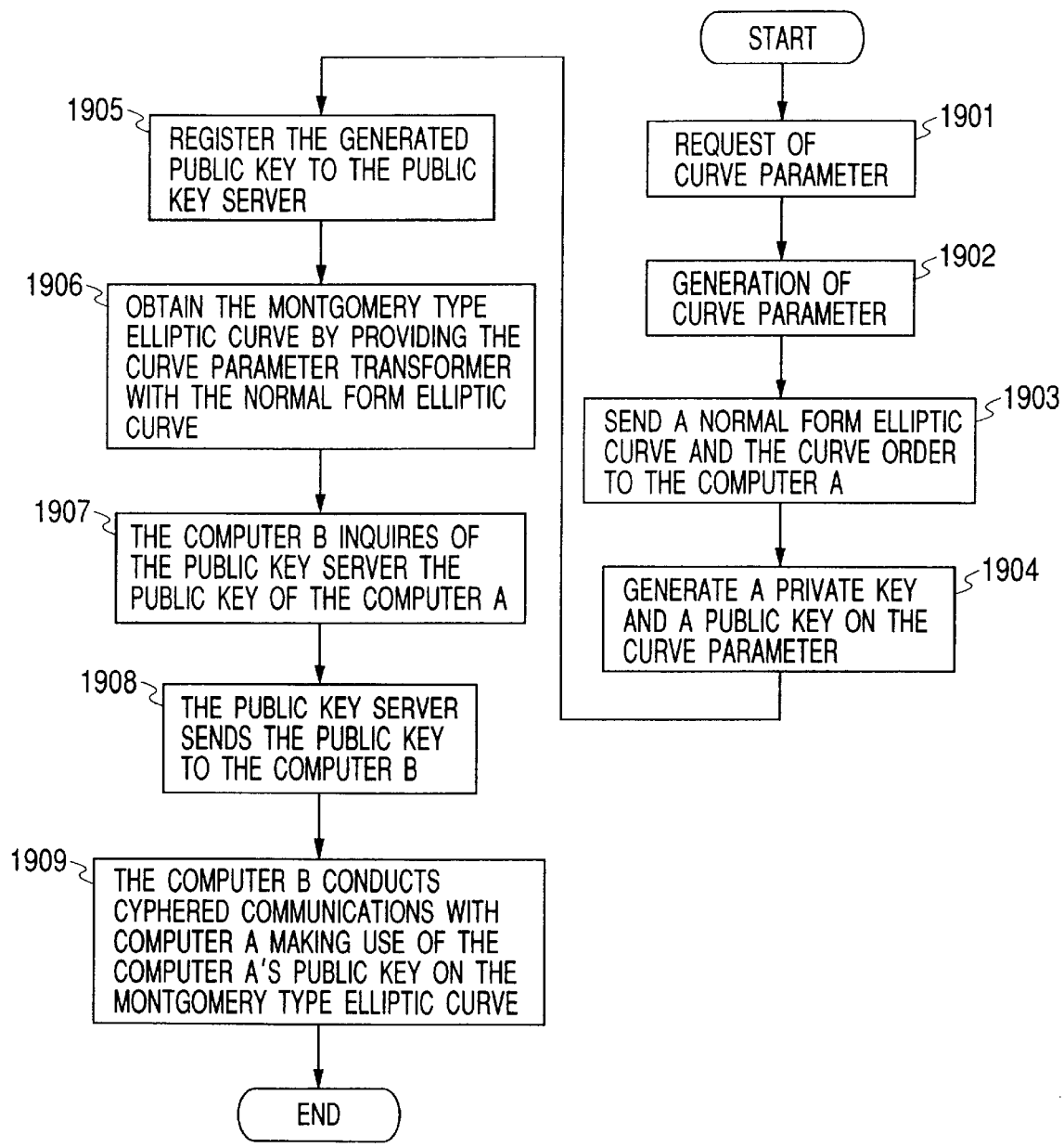
FIG. 19 is a flowchart showing a method for generating a curve in an elliptic curve cryptosystem according to the sixth embodiment of the present invention.

According to the sixth embodiment, an elliptic curve cryptosystem carries out cryptocommunications by utilizing the parameter generator of elliptic curve using the following procedure as shown by the flowchart in FIG. 19. The computer A1802 asks the curve parameter generation server 1801 to generate a safe normal form elliptic curve transformable to a Montgomery type elliptic curve at step 1901. Based on the above request for generation of the curve, the curve parameter generation server 1801 generates the curve parameters 108 by supplying the definition field information 103 to the parameter generator of elliptic curve 101, at step 1902. Here, as the definition field information 103, either definition field information 2701, which includes the bit length of the definition field, or definition field information 2704, which includes the characteristic prime of the definition field, is given as shown in FIG. 27. As new curve parameters, the curve parameter generation server 1801 supplies the defining equation and the curve order of a normal form elliptic curve transformable to a Montgomery type elliptic curve to the computer A1802 at step 1903. The computer A1802 generates a pair of private and public keys based on the above curve parameters at step 1904. The computer A1802 registers the above generated public key in the public key server 1803 at step 1905. The public key server 1803 supplies to the curve parameter transformer 1805 the defining equation of the normal form elliptic curve for the public key of the computer A1802, which is transformable to a Montgomery type elliptic curve, receives from the curve parameter transformer 1805 the defining equation of a Montgomery type elliptic curve obtained by transforming the above normal form elliptic curve transformable to a Montgomery type elliptic curve and the x coordinate of a 2-order point on the normal form elliptic curve corresponding to the point (0,0) on the Montgomery type elliptic curve, and adds them to information on the public key of the computer A1802 at step 1906. The computer B1804 inquires of the public key server 1803 about the public key of the computer A1802 at step 1907. Based on the public key inquiry made by the computer B1804, the public key server 1803 supplies the public key of the computer A1802 to the computer B1804 at step 1908. The computer B1804 performs encryption operation with the public key of the computer A1802 by utilizing a Montgomery type elliptic curve to carry out cryptocommunications with the computer A1802 at step 1909. It should be noted that the order of steps 1906 and 1907 may be changed such that the public key server 1803 asks the curve parameter transformer 1805 to transform the normal form elliptic curve to a Montgomery type elliptic curve after the computer B1804 inquires of the public key server 1803 about the public key of the computer A1802.

Figure 20:
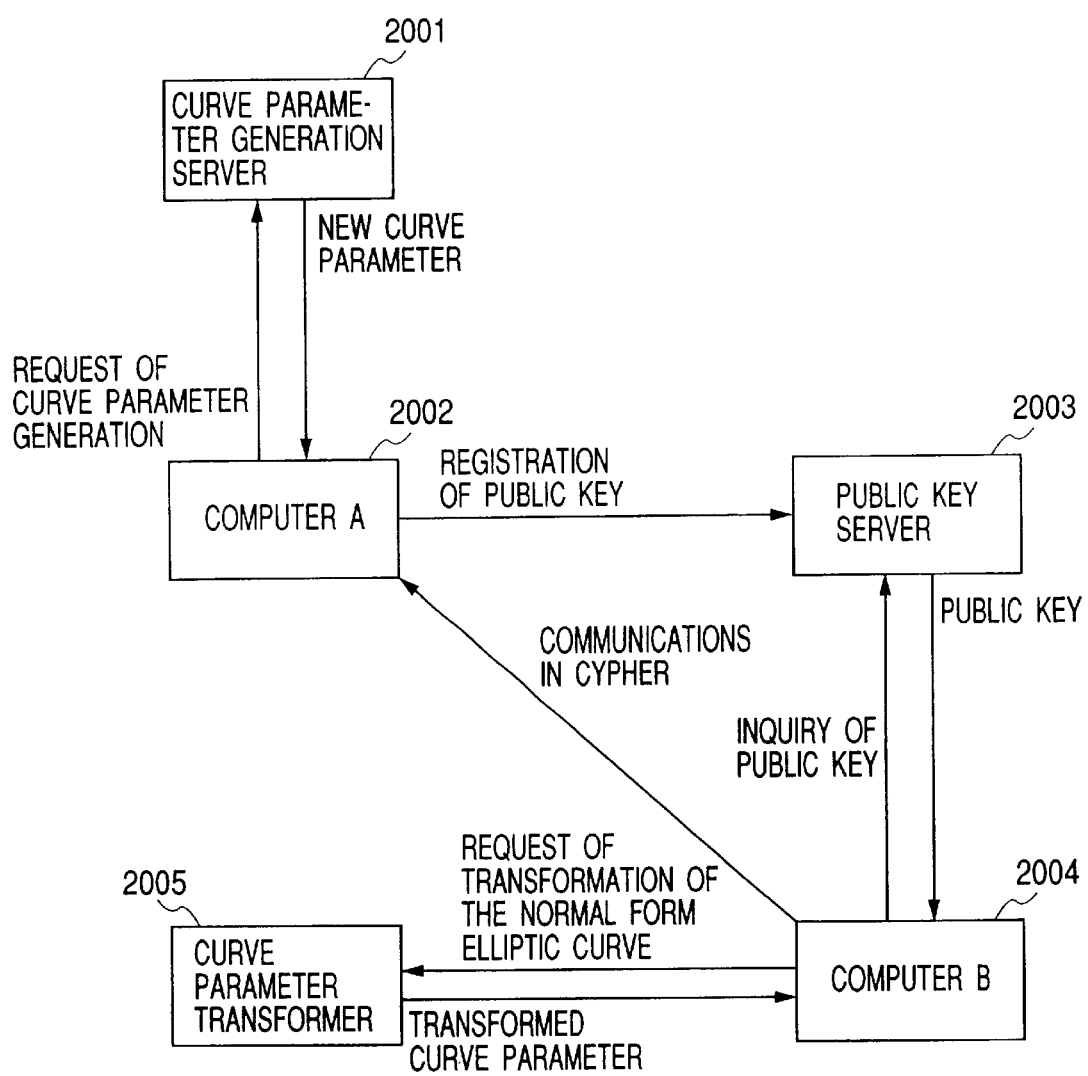
FIG. 20 is a configurational diagram of an elliptic curve cryptosystem according to a seventh embodiment of the present invention.

FIG. 20 is a diagram showing an elliptic curve cryptosystem which incorporates an apparatus for generating a safe normal form elliptic curve transformable to a Montgomery type elliptic curve according to a seventh embodiment.

A curve parameter generation server 2001 incorporates the parameter generator of elliptic curve 101 of the first embodiment for generating a safe normal form elliptic curve transformable to a Montgomery type elliptic curve. A computer A2002 generates a pair of private and public keys to carry out cryptocommunications by elliptic curve cryptography using a Montgomery type elliptic curve. A public key server 2003 registers the public key of each computer, and receives a public key inquiry and transmits the public key of a specified computer. A computer B2004 carries out cryptocommunications with the computer A2002 by elliptic curve cryptography using a Montgomery type elliptic curve. A curve parameter transformer 2005 receives a normal form elliptic curve transformable to a Montgomery type elliptic curve, and outputs the Montgomery type elliptic curve corresponding to the normal form elliptic curve as well as the x coordinate of a 2-order point on the normal form elliptic curve corresponding to the point (0,0) on the Montgomery type elliptic curve.

Figure 21:
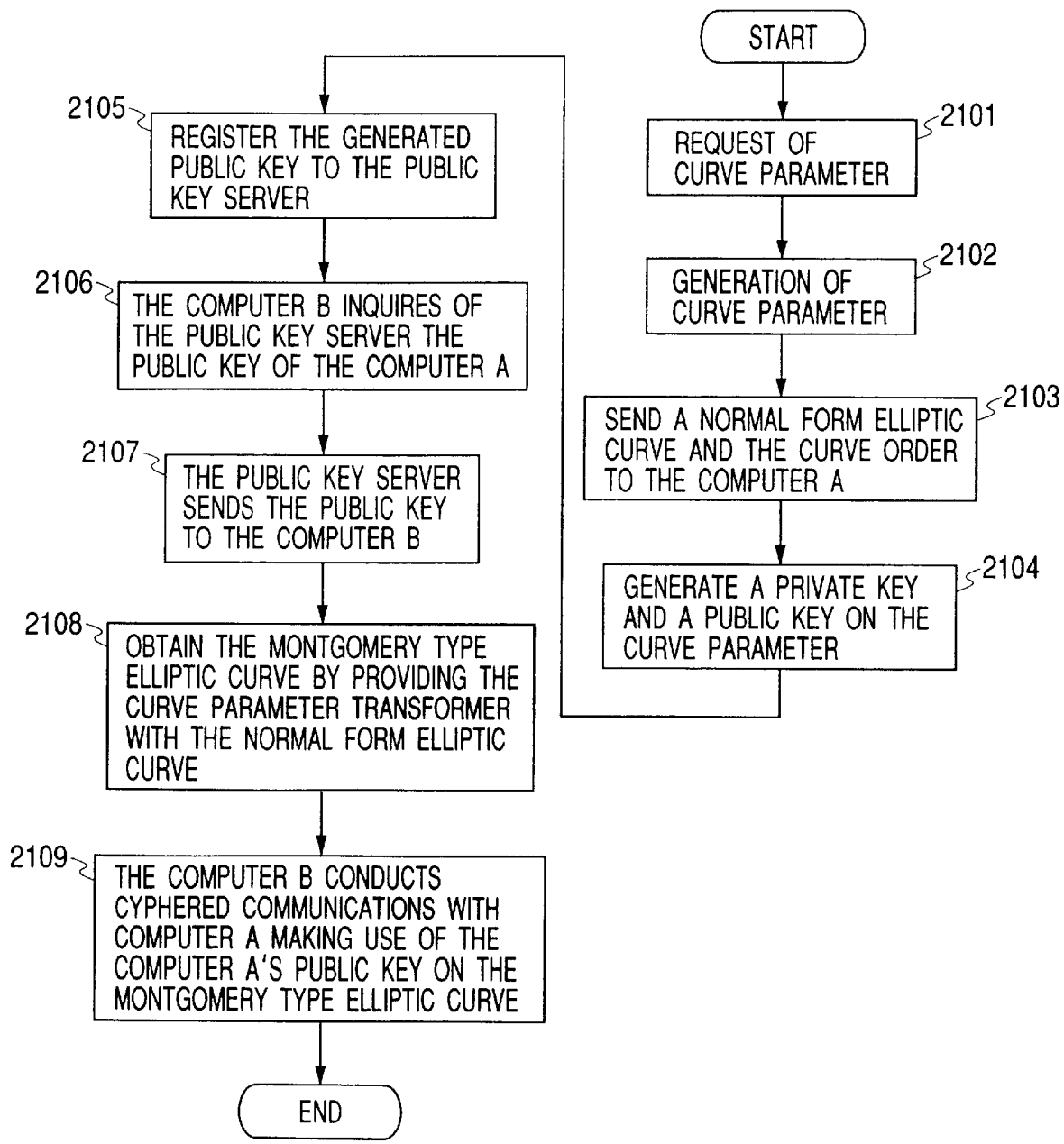
FIG. 21 is a flowchart showing a method for generating a curve in an elliptic curve cryptosystem according to the seventh embodiment of the present invention.

According to the seventh embodiment, the elliptic curve cryptosystem carries out cryptocommunications by utilizing the parameter generator of elliptic curve using the following procedure as shown by the flowchart in FIG. 21. The computer A2002 asks the curve parameter generation server 2001 to generate a safe normal form elliptic curve transformable to a Montgomery type elliptic curve at step 2101. Based on the above request for generation of the curve, the curve parameter generation server 2001 generates the curve parameters 108 by supplying the definition field information 103 to the parameter generator of elliptic curve 101, at step 2102. Here, as the definition field information 103, either definition field information 2701, which includes the bit length of the definition field, or definition field information 2704, which includes the characteristic prime of the definition field, is given as shown in FIG. 27. As new curve parameters, the curve parameter generation server 2001 supplies the defining equation and the curve order of a normal form elliptic curve transformable to a Montgomery type elliptic curve to the computer A2002 at step 2103. The computer A2002 generates a pair of private and public keys based on the above curve parameters at step 2104. The computer A2002 registers the above generated public key in the public key server 2003 at step 2105. The computer B2004 inquires of the public key server 2003 about the public key of the computer A2002 at step 2106. Based on the public key inquiry made by the computer B2004, the public key server 2003 supplies the public key of the computer A2002 to the computer B2004 at step 2107. The computer B2004 supplies to the curve parameter transformer 2005 the defining equation of the normal form elliptic curve for the public key of the computer A2002, which is transformable to a Montgomery type elliptic curve, receives from the curve parameter transformer 2005 the defining equation of a Montgomery type elliptic curve obtained by transforming the above normal form elliptic curve transformable to a Montgomery type elliptic curve and the x coordinate of a 2-order point on the normal form elliptic curve corresponding to the point (0,0) on the Montgomery type elliptic curve, and adds them to information on the public key of the computer A2002 at step 2108. The computer B2004 performs encryption operation with the public key of the computer A2002 by utilizing a Montgomery type elliptic curve to carry out cryptocommunications with the computer A2002 at step 2109.

Figure 22:
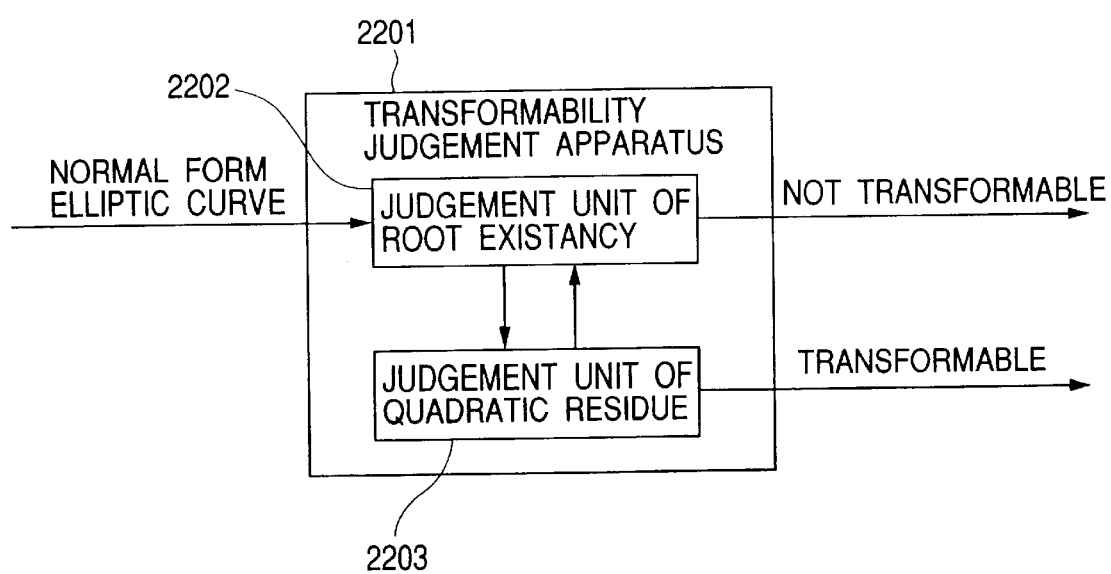
FIG. 22 is a diagram showing a flow of processes in a method and an apparatus for judging transformability of a normal form elliptic curve to a Montgomery type elliptic curve in a parameter generator of elliptic curve.

FIG. 22 is a diagram showing a transformability judgement apparatus for determining transformability of a normal form elliptic curve to a Montgomery type elliptic curve in an apparatus for generating a safe normal form elliptic curve transformable to a Montgomery type elliptic curve.

A transformability. judgement apparatus 2201 determines whether a given normal form elliptic curve can be transformed to a Montgomery type elliptic curve, using a judgement unit of root existancy 2202 and a judgement unit of quadratic residue 2203. The judgement unit of root existancy 2202 determines whether the equation f(x)=0 has a root in $F_p$. The transformability judgement apparatus 2201 outputs the indication "not transformable" when f'($\alpha$) has no root other than ones which have been determined to be quadratic non-residues by the judgement unit of quadratic residue 2203. If there exists a root, the root is supplied to the judgement unit of quadratic residue 2203. The judgement unit of quadratic residue 2203 determines whether f'($\alpha$) is a quadratic residue in $F_p$ for $\alpha$ for which f($\alpha$)=0. If it is a quadratic residue, the indication "transformable" is output. If it is a quadratic non-residue, the judgement unit of quadratic residue 2203 inquires of the judgement unit of root existancy 2202 whether there is any other root.

Figure 3:
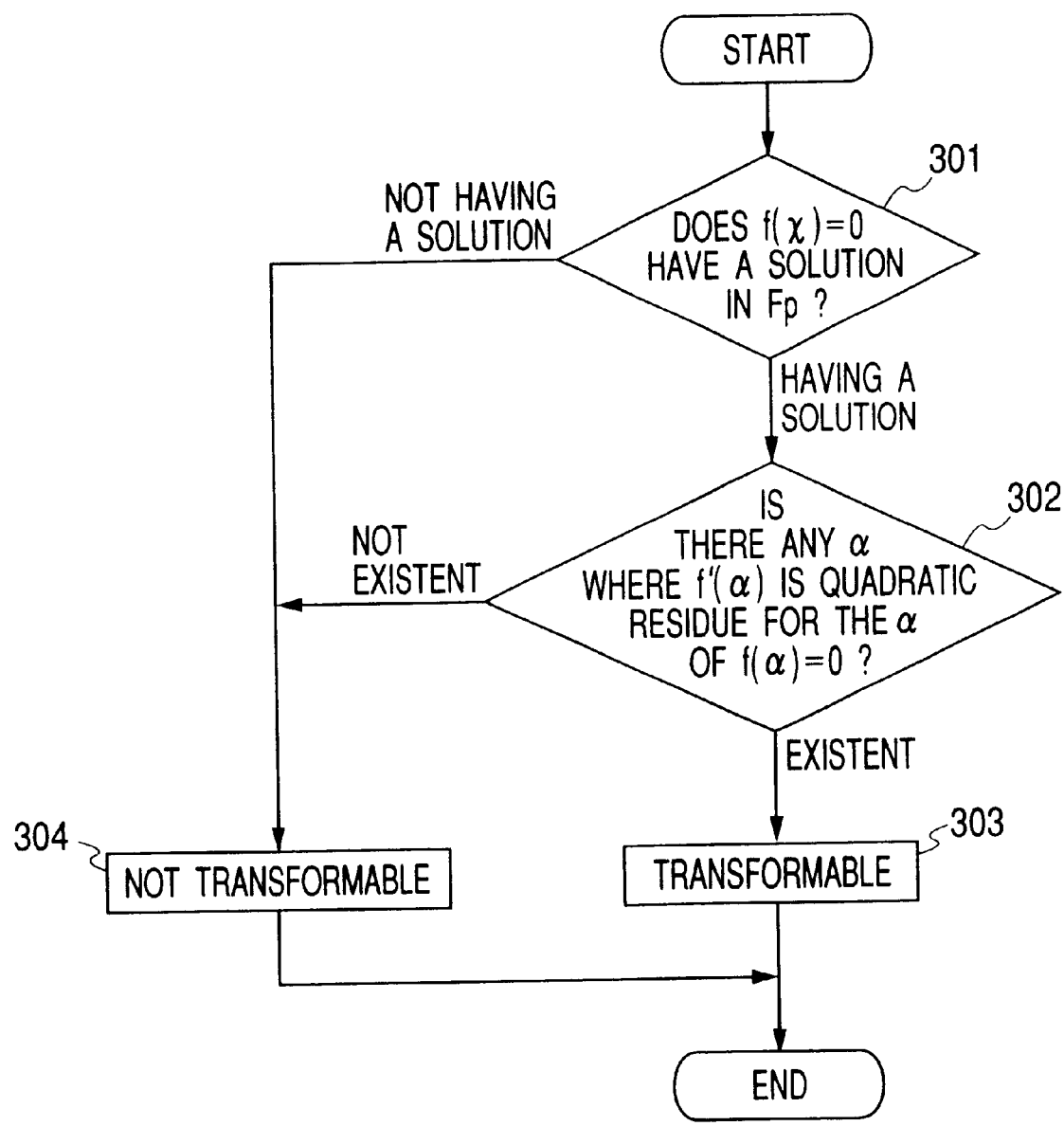
FIG. 3 is a flowchart showing a method for determining whether a normal form elliptic curve can be transformed to a Montgomery type elliptic curve, this method being included in a transformability judgement unit in a method and an apparatus for generating an elliptic curve according to the present invention.

The transformability judgement apparatus 2201 determines whether a normal form elliptic curve can be transformed to a Montgomery type elliptic curve using the following procedure as shown by the flowchart in FIG. 3. At step 301, it is determined whether there is any element $\alpha$ of $F_p$ for which f($\alpha$)=0 for the normal form elliptic curve $y^2=f(x)=x^3+ax+b$. If there is no such element $\alpha$, the transformability judgement apparatus 2201 outputs the indication "not transformable" at step 304 and the process ends. If there is such an element $\alpha$, the judgement unit of quadratic residue 2203 determines whether there is an element $\alpha$ for which f'($\alpha$) is a quadratic residue in $F_p$ where f($\alpha$)=0 at step 302. If there is such an element $\alpha$, the transformability judgement apparatus 2201 outputs the indication "transformable" at step 303 and the process ends. If there is no such element $\alpha$, the transformability judgement apparatus 2201 outputs the indication "not transformable" at step 304 and the process ends.

Figure 23:
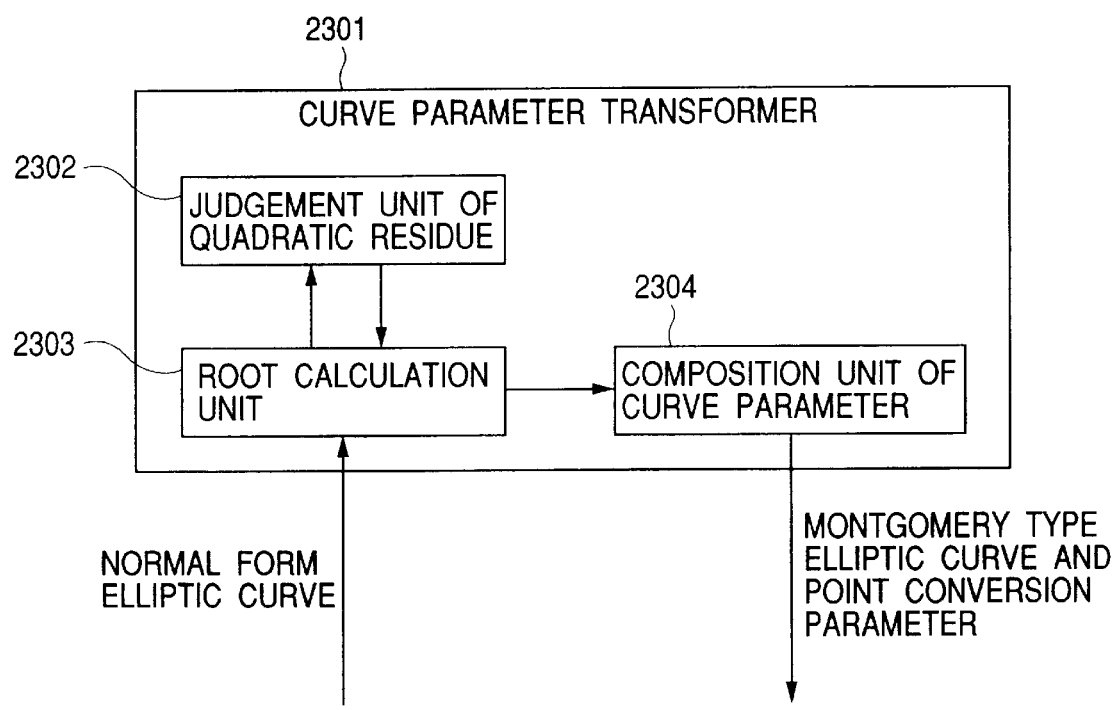
FIG. 23 is a diagram showing a flow of processes in which a normal form elliptic curve is transformed to a Montgomery type elliptic curve in a curve parameter transformer in an elliptic curve cryptosystem according to the present invention.

FIG. 23 is a diagram showing a curve parameter transformer in elliptic curve cryptosystems, shown in FIGS. 16, 18, and 20, which each incorporates an apparatus for generating a safe normal form elliptic curve transformable to a Montgomery type elliptic curve.

The curve parameter transformer 2301 receives a normal form elliptic curve transformable to a Montgomery type elliptic curve, and calculates and outputs the corresponding Montgomery type elliptic curve and the x coordinate of a 2-order point on the normal form elliptic curve corresponding to the point (0,0) on the Montgomery type elliptic curve as a point transformation parameter, using a root calculation unit 2303, a judgement unit of quadratic residue 2302, and a composition unit of curve parameter 2304. The root calculation unit 2303 finds a root $\alpha$ of the equation f(x)=0 in $F_p$. The judgement unit of quadratic residue 2302 determines whether f'($\alpha$) is a quadratic residue in $F_p$ for $\alpha$ obtained by the root calculation unit 2303. The composition unit of curve parameter 2304 composes a Montgomery type elliptic curve using $\alpha$ obtained by the root calculation unit 2303.

Figure 24:
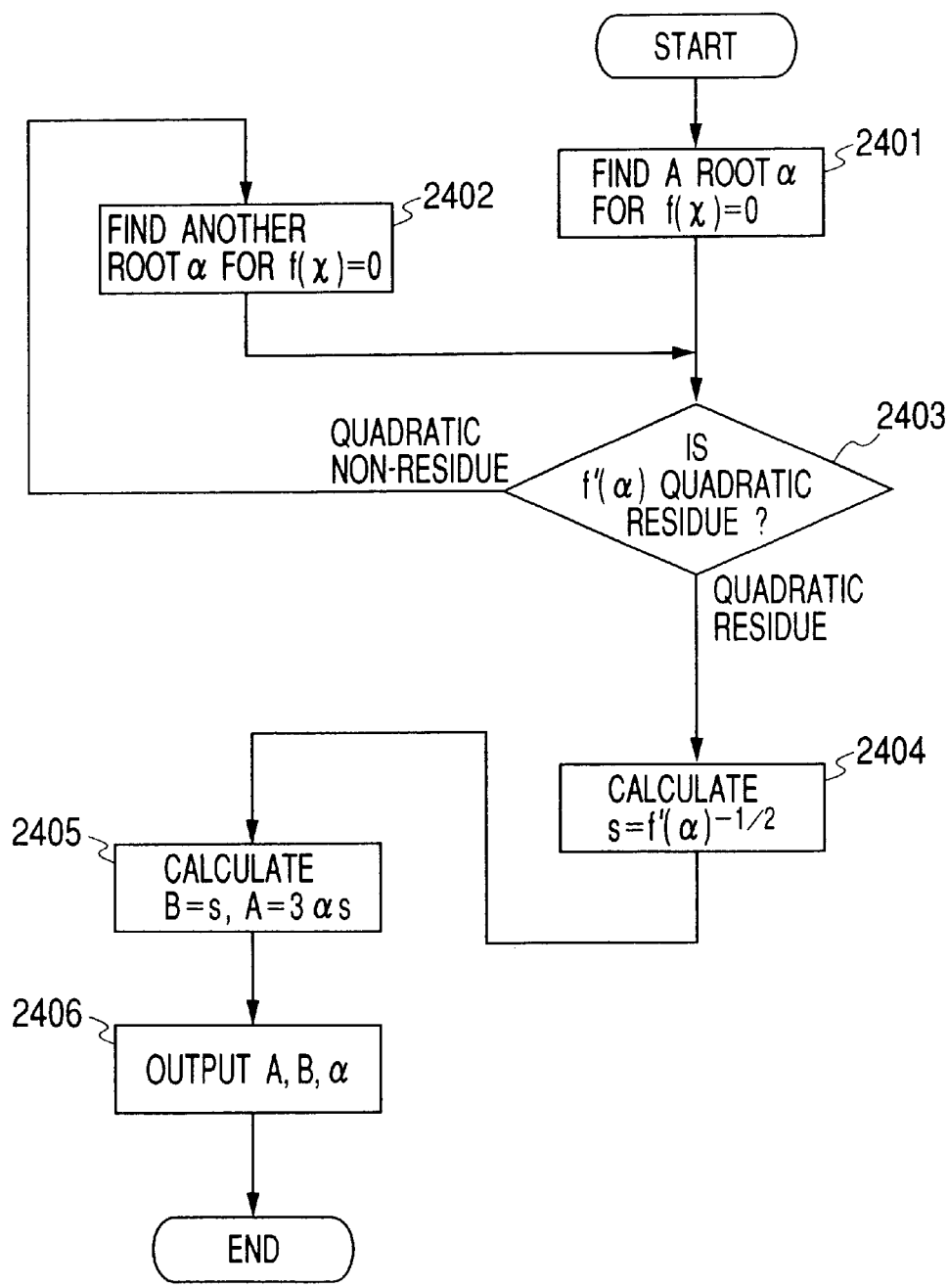
FIG. 24 is a flowchart showing a method for transforming curve parameters.

The curve parameter transformer 2301 calculates a Montgomery type elliptic curve transformed from a normal form elliptic curve transformable to a Montgomery type elliptic curve, and the x coordinate of a 2-order point on the normal form elliptic curve corresponding to the point (0,0) on the Montgomery type elliptic curve, using the following procedure as shown by the flowchart in FIG. 24. Step 2401 finds a root a of the equation f(x)=0 in $F_p$. At step 2403, it is determined whether f'($\alpha$) is a quadratic residue in $F_p$. If it is a quadratic residue, the process flow proceeds to step 2404. If it is a quadratic non-residue, step 2402 finds a root other than $\alpha$ for which it is determined that f'($\alpha$) is a quadratic non-residue at step 2403. The root is newly denoted as $\alpha$. Then, for the root $\alpha$, it is determined whether f'($\alpha$) is a quadratic residue in $F_p$ at step 2403 again. Since the equation f(x)=0 has 3 roots at most, and the normal form elliptic curve is already known to be transformable to a Montgomery type elliptic curve, f'($\alpha$) is determined to be a quadratic residue by the time the process has been repeated for the third time. Then, the process proceeds to step 2404. Step 2404 calculates s from the equation $s = f'(\alpha)^{-1/2}{}_1$, and step 2405 calculates B and A from the equations $B = s$ and $A = 3\alpha s$. A, B, and $\alpha$ are output at step 2406.

As shown in FIG. 27, by use of a curve parameter transformer as described above, a curve parameter 2702 and a public key 2703 each obtained only from a normal form elliptic curve can be transformed to a curve parameter 2705 and a public key 2706 respectively each added with the corresponding Montgomery type elliptic curve data.

Figure 25:
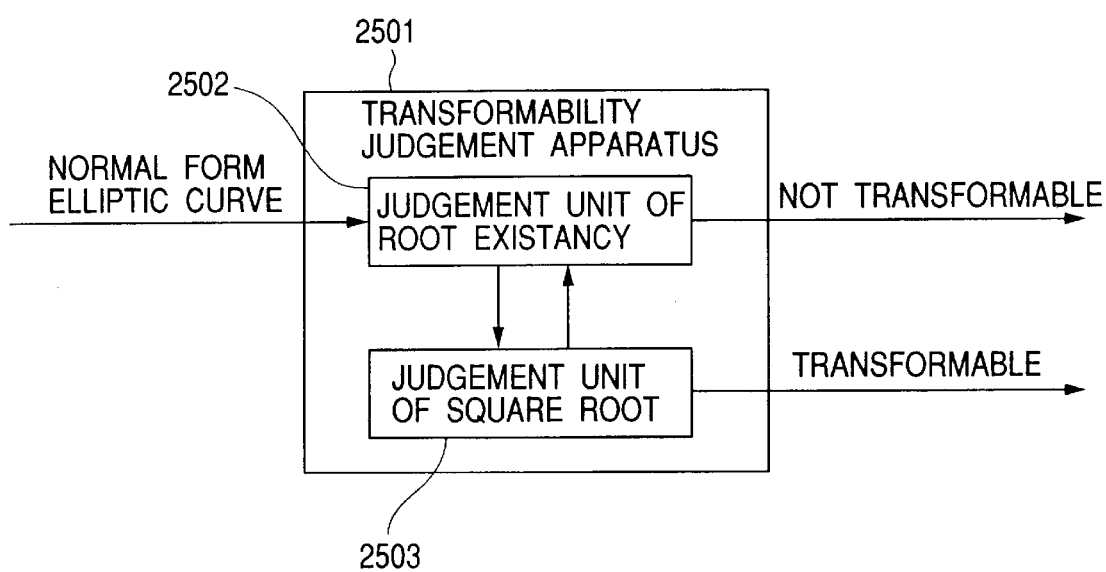
FIG. 25 is a diagram showing a flow of processes in a method and an apparatus for judging transformability of a normal form elliptic curve to a Montgomery type elliptic curve in a parameter generator of elliptic curve according to the present invention.

FIG. 25 is a diagram showing a transformability judgement apparatus for determining transformability of a normal form elliptic curve to a Montgomery type elliptic curve in an apparatus for generating a safe normal form elliptic curve defined over an extension field $F_q$ of $F_p$ and transformable to a Montgomery type elliptic curve.

A transformability judgement apparatus 2501 determines whether a given normal form elliptic curve defined over $F_q$ can be transformed to a Montgomery type elliptic curve, using a judgement unit of root existancy 2502 and a judgement unit of square root 2503. The judgement unit of root existancy 2502 determines whether the equation $f(x)=0$ has a root in $F_q$. The transformability judgement apparatus 2501 outputs the indication "not transformable" when $f'(\alpha)$ has no root other than ones which have been determined to be quadratic non-residues by the judgement unit of square root 2503. If there exists a root, the root is supplied to the judgement unit of square root 2503. The judgement unit of square root 2503 determines whether $f'(\alpha)$ has a square root in $F_q$ for $\alpha$ for which $f(\alpha)=0$. If it has a square root, the indication "transformable" is output. If it has no square root, the judgement unit of square root 2503 inquires of the judgement unit of root existancy 2502 whether the equation $f(x)=0$ has any other root.

Figure 26:
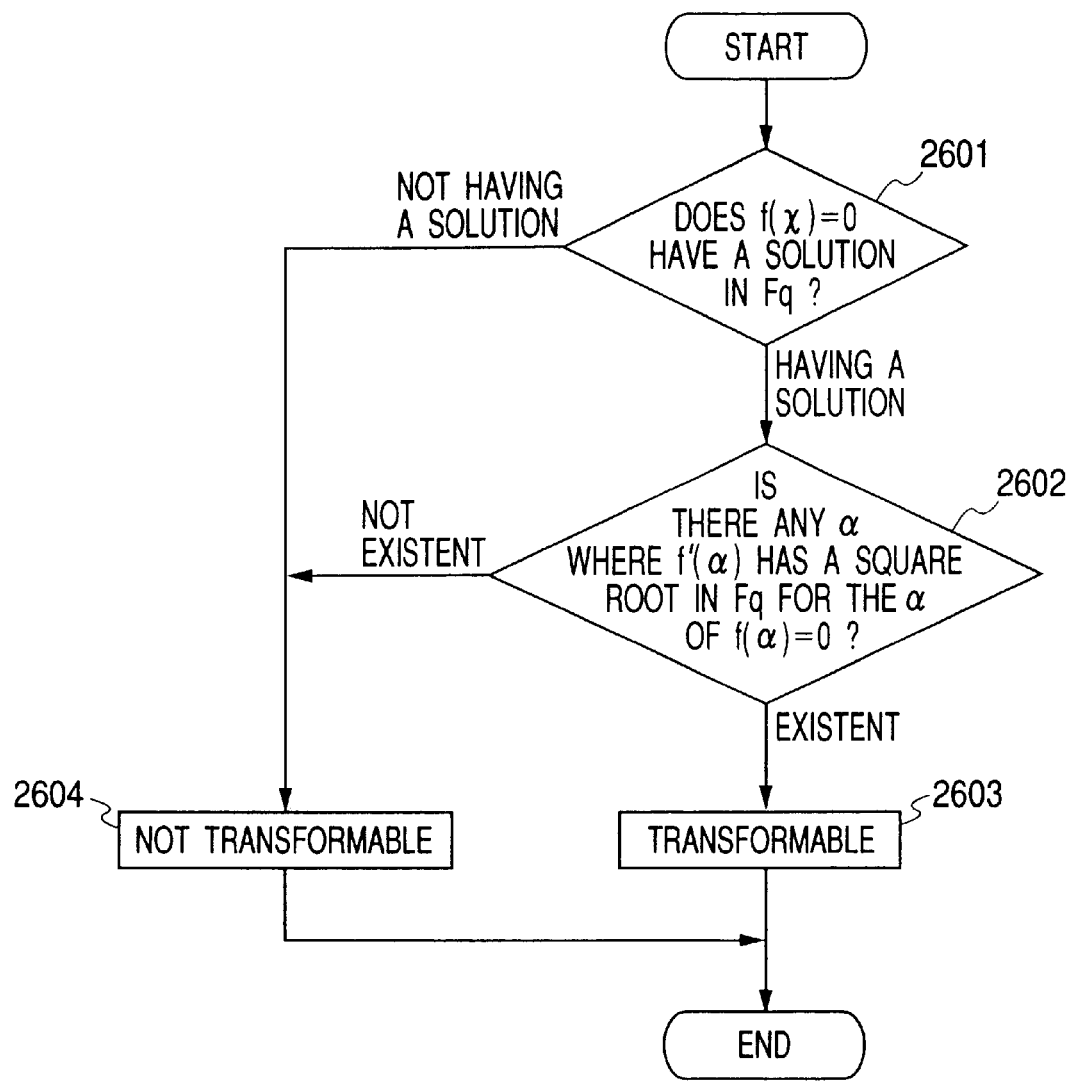
FIG. 26 is a flowchart showing a method for judging transformability of a normal form elliptic curve to a Montgomery type elliptic curve.

The transformability judgement apparatus 2501 determines whether a normal form elliptic curve defined over $F_q$ can be transformed to a Montgomery type elliptic curve using the following procedure as shown by the flowchart in FIG. 26. At step 2601, it is determined whether there is any element $\alpha$ of $F_q$ for which $f(\alpha)=0$ for the normal form elliptic curve $y^2 = f(x) = x^3 + ax + b$. If there is no such element $\alpha$, the transformability judgement apparatus 2501 outputs the indication "not transformable" at step 2604 and the process ends. If there is such an element $\alpha$, the judgement unit of square root 2503 determines whether there is an element $\alpha$ for which $f'(\alpha)$ has a square root in $F_q$ where $f(\alpha)=0$ at step 2602. If there is such an element $\alpha$, the transformability judgement apparatus 2501 outputs the indication "transformable" at step 2603 and the process ends. If there is no such element $\alpha$, the transformability judgement apparatus 2501 outputs the indication "not transformable" at step 2604 and the process ends.

Figure 28:
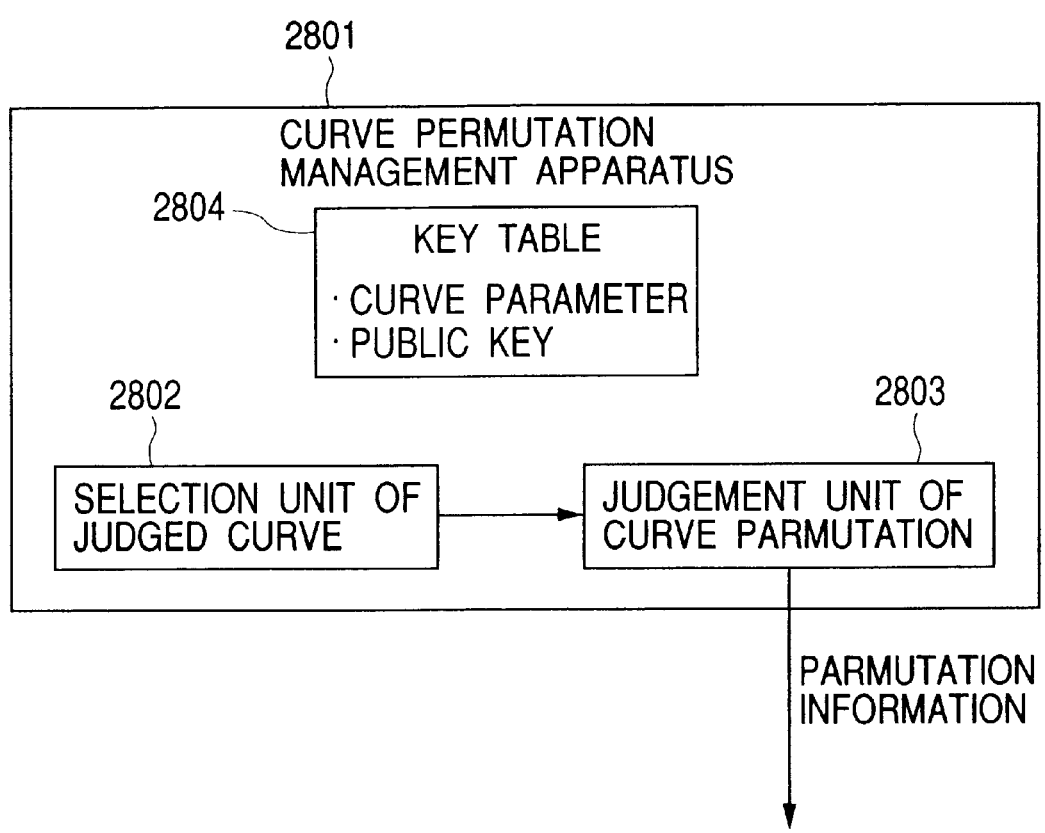
FIG. 28 is a diagram showing an embodiment of a curve permutation management apparatus.

FIG. 28 is a diagram showing a curve permutation management apparatus to be incorporated in a public key server, a computer A, or computer B in an elliptic curve cryptosystem which incorporates an apparatus for generating a safe normal form elliptic curve transformable to a Montgomery type elliptic curve.

A curve permutation management apparatus 2801 comprises a selection unit of judged curve 2802, a judgement unit of curve permutation 2803, and a key table 2804. The key table 2804 is a data table listing curve parameters and public keys.

The selection unit of judged curve 2802 is activated at a predetermined time or every predetermined period of time to select curve parameters from the key table 2804. The selected curve parameters are sent to the judgement unit of curve permutation 2803. The judgement unit of curve permutation 2803 checks whether the generation time of the received curve parameters or the number of users of the curve parameters exceeds a predetermined value which must not be exceeded in order to maintain safety, and when it exceeds the value, the judgement unit of curve permutation 2803 outputs an indication indicating that it is necessary to replace the given curve parameters with new ones.

Figure 29:
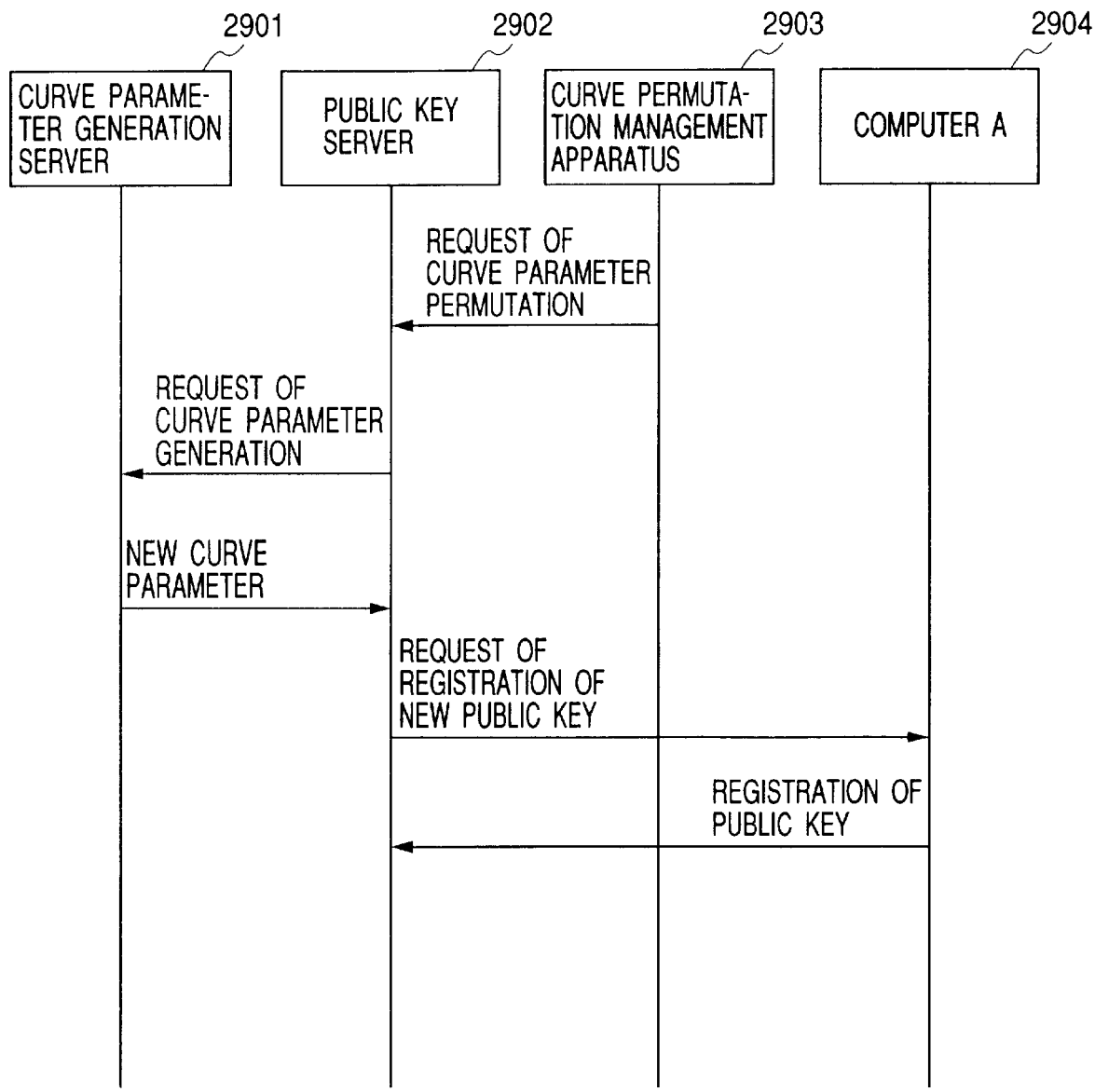
FIG. 29 is a sequence chart showing a flow of processes for curve parameter permutation in an elliptic curve cryptosystem in which a curve permutation management apparatus is incorporated in a public key server.

FIG. 29 is a sequence chart showing a flow of processes performed in the case where the curve permutation management apparatus shown in FIG. 28 is incorporated in a public key server.

A curve permutation management apparatus 2903 sends a curve parameter permutation request to a public key server 2902. Based on the curve parameter permutation request made by the curve permutation management apparatus 2903, the public key server 2902 sends a curve parameter generation request to a curve parameter generation server 2901. Based on the curve parameter generation request made by the public key server 2902, the curve parameter generation server 2901 generates new curve parameters, and sends them to the public key server 2902. The public key server 2902 replaces the current curve parameters with new curve parameters received from the curve parameter generation server 2901. The public key server 2902 sends the new curve parameters and a new-public-key registration request to a computer A2904 which is currently using the previous curve parameters. Based on the new-public-key registration request made by the public key server 2902, the computer A2904 generates a pair of private and public keys for the received new curve parameters. The computer A2904 then registers the generated public key in the public key server 2902.

As described above, the present invention can provide a reduction in the number of generations of a safe normal form elliptic curve necessary to generate a safe normal form elliptic curve transformable to a Montgomery type elliptic curve, resulting in reduced cost for generating an elliptic curve having the above property. Thus, it is possible to regularly replace an elliptic curve used for cryptography with a new one having the above property in order to prevent an attack against a specific elliptic curve. Furthermore, since the elliptic curve can be transformed to a Montgomery type elliptic curve, use of the Montgomery type elliptic curve makes it possible to reduce the time taken to encrypt/decrypt data, compared with use of a normal form elliptic curve.

Industrial Applicability

As described above, the present invention is useful for maintaining security for computer networks, and especially suitable for use in the environment in which security management is performed by use of elliptic curve cryptography.

What is claimed is:

1. A method of generating an elliptic curve, comprising the steps of:
    generating a first elliptic curve;
    generating a second elliptic curve related to said first elliptic curve;
    determining whether said first elliptic curve can be transformed to a third elliptic curve; and
    when said first elliptic curve can be transformed to said third elliptic curve, determining safety of said first elliptic curve and said second elliptic curve.

2. The method of generating an elliptic curve as claimed in claim 1, wherein said second elliptic curve is a twist of said first elliptic curve.

3. The method of generating an elliptic curve as claimed in claim 1, wherein said first elliptic curve is $y^2=x^3+ax+b$; said second elliptic curve is $y^2=x^3+ar^2x+br^3$; and said third elliptic curve is $BY^2X^3+AX^2+X$.

4. The method of generating an elliptic curve as claimed in claim 3, wherein said step of determining whether said first elliptic curve can be transformed to said third elliptic curve includes steps of:

determining whether there is $\alpha$ for which $f(\alpha)=0$ for said first elliptic curve $y^2=f(x)$; and determining whether $f'(\alpha)$ has a square root for a for which $f(\alpha)=0$.

5. The method of generating an elliptic curve as claimed in claim 1, wherein said step of determining the safety of said first elliptic curve includes steps of:

extracting information on a curve order of said first elliptic curve; and determining a cofactor based on the information on said curve order.

6. The method of generating an elliptic curve as claimed in claim 1, wherein said method uses the first elliptic curve defined over a field of a predetermined prime order.

7. A method of generating an elliptic curve, comprising the steps of:

generating a first elliptic curve;

determining whether said first elliptic curve can be transformed to a second elliptic curve;

when said first elliptic curve can be transformed to said second elliptic curve, determining safety of said first elliptic curve; and when it is determined that said first elliptic curve is not safe, determining safety of a third elliptic curve which accompanies said first elliptic curve.

8. A method of generating an elliptic curve in elliptic curve cryptography, comprising the steps of:

randomly generating a normal form elliptic curve $y^2=x^3+ax+b$;

determining whether said generated normal form elliptic curve $y^2=x^3+ax+b$ can be transformed to a Montgomery type elliptic curve $BY^2=X^3+AX^2+X$;

determining divisibility of a curve order of said elliptic curve by 8;

collecting information on the curve order of said elliptic curve; and determining a value of a cofactor based on the information on said curve order; wherein a normal form elliptic curve which can be transformed to a Montgomery type elliptic curve and whose cofactor is 4 is generated.

9. An apparatus for generating an elliptic curve, comprising:

elliptic curve candidate generating means for generating a first elliptic curve $y^2=x^3+ax+b$;

transformability judgement means for determining whether said first elliptic curve can be transformed to a second elliptic curve $By^2=X^3+AX^2+X$; and safety judgement means for determining safety of the first elliptic curve transformable to said second elliptic curve.

10. The apparatus for generating an elliptic curve as claimed in claim 9, wherein said transformability judgement means includes:

root existence judgement means for determining whether there is a for which $f(\alpha)=0$ for said first elliptic curve; and square root judgement means for determining whether $f'(\alpha)$ has a square root for a for which $f(\alpha)=0$.

11. The apparatus for generating an elliptic curve as claimed in claim 9, wherein said transformability judgement means includes:

root existence judgement means for determining whether there is $\alpha$ for which $f(\alpha)=0$ for said first elliptic curve; and quadratic residue judgement means for determining whether $f'(\alpha)$ is a quadratic residue for a for which $f(\alpha)=0$.

12. An apparatus for generating an elliptic curve employed in a cryptosystem in which a first computer and a second computer carry out cryptocommunications with each other, wherein said apparatus receives a request for generation of an elliptic curve from each said computer, and generates a normal form elliptic curve transformable to a Montgomery type elliptic curve.

13. A storage medium storing a program for performing a method for generating an elliptic curve, said method comprising the steps of:

generating a first elliptic curve $y^2=x^3+ax+b$;

generating a second elliptic curve $y^2=x^3+ar^2x+br^3$ which is related to said first elliptic curve;

determining whether said first elliptic curve can be transformed to a third elliptic curve $BY^2=X^3+AX^2+X$;

determining safety of the first elliptic curve which can be transformed to said third elliptic curve; and determining safety of said second elliptic curve.

14. A cryptosystem for carrying out cryptocommunications by use of elliptic curve cryptography, comprising:

a first computer for receiving cryptocommunication;

a second computer for transmitting cryptocommunication; and an elliptic curve generating apparatus for receiving a request for generation of an elliptic curve from said first computer, and generating a normal form elliptic curve transformable to a Montgomery type elliptic curve.

15. The cryptosystem for carrying out cryptocommunications by use of elliptic curve cryptography as claimed in claim 14, further comprising:

a curve replacement management apparatus for managing whether it is necessary to replace an elliptic curve being used for cryptocommunications, wherein when it becomes necessary to replace said elliptic curve, the elliptic curve is replaced with an elliptic curve newly generated by said elliptic curve generating apparatus to carry out cryptocommunications.

* * * * *